United States Patent
Prilepov et al.

(10) Patent No.: US 9,489,372 B2
(45) Date of Patent: Nov. 8, 2016

(54) WEB-BASED SPELL CHECKER

(71) Applicant: Apple Inc., Cupertino, CA (US)

(72) Inventors: Iuri Prilepov, Davis, CA (US); Tang-lung Cheung, San Francisco, CA (US); Keng-fai Lee, Cupertino, CA (US); Siu-lung Tam, Causeway Bay (HK); Man-hon Chan, Kowloon (HK)

(73) Assignee: APPLE INC., Cupertino, CA (US)

( * ) Notice: Subject to any disclaimer, the term of this patent is extended or adjusted under 35 U.S.C. 154(b) by 525 days.

(21) Appl. No.: 13/842,827

(22) Filed: Mar. 15, 2013

(65) Prior Publication Data

US 2014/0281943 A1   Sep. 18, 2014

(51) Int. Cl.
*G06F 17/00*   (2006.01)
*G06F 17/27*   (2006.01)

(52) U.S. Cl.
CPC ......... *G06F 17/2735* (2013.01); *G06F 17/273* (2013.01)

(58) Field of Classification Search
CPC ... G06F 17/273; G06F 17/27; G06F 17/2735
See application file for complete search history.

(56) References Cited

U.S. PATENT DOCUMENTS

| 5,892,919 | A  | * | 4/1999  | Nielsen .......................... 709/228 |
| 6,047,300 | A  | * | 4/2000  | Walfish et al. ................ 715/257 |
| 6,785,869 | B1 | * | 8/2004  | Berstis .......................... 715/210 |
| 7,089,188 | B2 | * | 8/2006  | Logan et al. .................. 704/270 |
| 7,098,188 | B2 | * | 8/2006  | Abdel-Magid ........ C07H 11/00 514/23 |
| 7,296,019 | B1 | * | 11/2007 | Chandrasekar et al. |
| 7,565,606 | B2 | * | 7/2009  | Bates et al. ................... 715/257 |
| 7,809,744 | B2 | * | 10/2010 | Nevidomski et al. ........ 707/759 |
| 8,290,772 | B1 | * | 10/2012 | Cohen et al. .................. 704/235 |
| 8,666,961 | B1 | * | 3/2014  | Qureshi ............ G06F 17/30312 707/705 |
| 9,177,293 | B1 | * | 11/2015 | Gagnon ............... G06Q 10/107 |
| 2002/0123882 | A1 |   | 9/2002  | Mohammed |
| 2002/0194229 | A1 | * | 12/2002 | Decime et al. ............... 707/533 |
| 2005/0223326 | A1 | * | 10/2005 | Chang .................. G06Q 10/107 715/257 |

(Continued)

FOREIGN PATENT DOCUMENTS

WO   WO 00/57291   9/2000
WO   PCT/US2013/077723   12/2013

OTHER PUBLICATIONS

International Search Report and Written Opinion for PCT/US2013/077723, Apr. 30, 2014 (mailing date), Apple Inc.

(Continued)

*Primary Examiner* — Laurie Ries
(74) *Attorney, Agent, or Firm* — Adeli LLP

(57) ABSTRACT

A fast client-side spell checker is provided that builds efficient structures out of dictionary and a common misspelling list and uses the structures to prune the number of searches required to identify misspelled words and provide suggestions for correcting the misspelled words. The spell checker is a browser-based application, which is provided by a server to a client device. The server sends the dictionary and a list of common misspellings to the client device in the form of efficient data structures. The spell checker utilizes a set of rules to identify the words that are not in the dictionary but are intended to be correct as typed. The spell checker is used by different browser-based applications that utilize the same spell checker regardless of the browser platform used to access the applications. The spell checker, therefore, provides a uniform spell checking user experience across different browser platforms.

26 Claims, 35 Drawing Sheets

(56) References Cited

U.S. PATENT DOCUMENTS

| | | | |
|---|---|---|---|
| 2005/0283726 A1* | 12/2005 | Lunati | 715/533 |
| 2006/0224586 A1* | 10/2006 | Pickover | G06F 17/273 |
| 2006/0241944 A1* | 10/2006 | Potter et al. | 704/254 |
| 2008/0091413 A1* | 4/2008 | El-Shishiny et al. | 704/10 |
| 2008/0275837 A1* | 11/2008 | Lambov | 706/48 |
| 2010/0268724 A1* | 10/2010 | Nevidomski et al. | 707/759 |
| 2010/0321299 A1* | 12/2010 | Shelley et al. | 345/168 |
| 2010/0325539 A1* | 12/2010 | Nedzlek et al. | 715/257 |
| 2011/0202876 A1* | 8/2011 | Badger et al. | 715/816 |
| 2011/0270820 A1* | 11/2011 | Agarwal | G06F 17/273 707/709 |
| 2012/0246133 A1 | 9/2012 | Hsu et al. | |
| 2013/0066896 A1* | 3/2013 | Mehanna et al. | 707/767 |
| 2014/0207748 A1* | 7/2014 | Sood et al. | 707/706 |
| 2014/0280109 A1* | 9/2014 | Zomet et al. | 707/728 |
| 2014/0281943 A1* | 9/2014 | Prilepov et al. | 715/257 |
| 2015/0019985 A1* | 1/2015 | Murphy et al. | 715/744 |

OTHER PUBLICATIONS

Author Unknown, "Java Script Spell Check Features—JavaScript Spell Check," Nov. 18, 2012, 3 pages, available at http://web.archive.org/web/20121118161243/http://www.javascriptspellcheck.com/Java_Script_Spell_Check_Features.

* cited by examiner

WEB-BASED SPELL CHECKER

BACKGROUND

Remote storage and computing services allow users to store data on remote computer servers and access them from multiple devices through a network, usually the Internet. In addition, some service providers allow users to access different applications in order to generate and manipulate documents. For instance, the users can download applications such as text editors, spreadsheet generators, presentation programs, etc., from the servers and access them in the browser.

Many of these applications are used to enter and manipulate text. A desired feature for any application that manipulates text is the ability to flag words that are not spelled correctly and to provide appropriate correction suggestions. Most spell checkers include a verification component and a suggestion component. The verification component utilizes one or more dictionaries or lists of words that are valid in each language. Each word in a document is compared against the entries for the appropriate language to identify possible misspellings. The suggestion component utilizes different algorithms and heuristics to identify what the user had intended to type and to provide correction suggestions.

The use of remote storage and computing services as well the use of smaller mobile devices with less computing resources provide several challenges for spell checker applications. On one hand the application has to be small for fast download through the Internet and fast execution on mobile devise with fewer computing resources. On the other hand, the application has to be able to identify misspelled errors as a user types the words and to quickly provide correction suggestions when the user asks for suggestions. Also, applications delivered in languages that are universally acceptable by different browsers (e.g., delivered in JavaScript), are generally less efficient then the native applications and require fast techniques in order to provide acceptable response time.

In a remote computing system, one possible solution is to send each word to the server and allow the more powerful resources of the server to do spell checking. The drawback for this option is the additional network traffic between the remote device and the server. In addition, sending the words to server for spell checking results in spell checking to become unavailable when the application is being used in offline mode.

Another possible solution for browser-based applications is to use the spell checking features of the browser. The drawback for this option is that different browsers have different spell checkers and accessing the same application through different browsers provides a non-uniform experience for the user.

BRIEF SUMMARY

Some embodiments provide a fast client-side spell checker. The spell checker is a browser application that downloads a dictionary and a list of common misspellings in the form of efficient data structures. The spell checker makes use of the efficient data structures to prune the number of searches performed to identify whether a typed word is in the dictionary, to identify whether a typed word is a common misspelling, and/or to provide suggestions for correcting the misspelled words. The spell checker in some embodiments also uses a set of rules to identify strings that are not in the dictionary but are valid since the strings are what the user has intended to type.

The spell checker is used by different browser-based applications that manipulate text and require spell checking. These browser-based applications use the same spell checker regardless of the browser platform (e.g., Safari®, Chrome®, Internet Explorer®, Firefox®, etc.) that is used to access the applications. In this way, the spell checker provides a uniform spell checking user experience across different platforms. In contrast, browser-based applications that reply on the browser's spell checker provide different experience for the user each time a different browser is used to access the application.

In some embodiments, the spell checker is a browser-based application, which is provided by a remote computing service server to a client device. The server also sends the dictionary and a list of common misspellings to the client device. In some embodiments the data structure used for pruning is a prefix tree (or a trie). The server builds a prefix tree out of the dictionary word list. The server then encodes the tree in a compress format and sends the tree to the spell checker in the client. The server also makes a look-up map in the form of a hash table for common misspellings and sends the table to the spell checker in some embodiments. In other embodiments, the server makes a prefix tree for the common misspellings and sends to the spell checker.

The spell checker decompresses the prefix tree and uses the dictionary prefix tree to check if a string is a dictionary word. The spell checker also uses the dictionary prefix tree for suggestion generation. The spell checker uses the common misspelling hash table (or the prefix tree in the embodiments that utilize a prefix tree for the common misspellings) to determine whether a string is a common misspelling. In some embodiments, the spell checker is written in a browser compatible language such as JavaScript. In some embodiments, the prefix tree and the hash table are kept in browser cache and are used at a later time as long as the cached data structures are considered valid according to cache update rules.

A prefix tree is an ordered tree data structure where the keys are strings. The position of a node in the tree defines the key with which the node is associated. In a prefix tree, all descendants of a node have a common prefix of the string associated with that node and the root is associated with the empty string. Not every node in the dictionary prefix tree is associated with a valid word in the dictionary. For instance, the word "captain" is represented by seven nodes in the tree. The first node represents character "c" and is a child of the root node. The second node represents character "a" and is a child of the first node, etc. The seventh node, which is associated with the valid word "captain," is flagged as a node that terminates a valid word in the dictionary. In addition, since "cap" is also a valid word, the third node is also flagged as a node that terminates a valid word. The common misspelling prefix tree has strings that represent common misspellings. Each common misspelling is associated with one or more suggestions for a correct spelling.

The spell checker compares a word with strings in the dictionary prefix tree. If the word does not match any valid word in the prefix tree, the word is identified as a possible misspelled word. Some strings such as compound words, IP addresses, decimal numbers, hexadecimal numbers, etc., are not in dictionary but are valid strings since they are what the user has intended to represent. Some embodiments utilize a set of rules to identify these strings and exclude them from being flagged as misspelled words.

A hash table is an associative array, which is a data structure that maps keys to values. The look-up map implemented as a hash table provides an efficient search mechanism when the number of entries in the table is small. Some embodiments prepare a list of suggestions for misspelled words. Each common misspelling is a key in the hash table and is associated with a set of values that are one or more strings used as suggestions to correct the common misspelling.

Some embodiments visually identify (e.g., underline) misspelled words. In some embodiments, a misspelled word is first compared with strings in the common misspelling hash table (or in the common misspelling prefix tree) and if a match is found, the associated suggestions are added to a list of possible suggestions. Some embodiments edit the misspelled words by adding, replacing, or deleting characters at each character position in a misspelled word in order to find correction suggestions. After each edit to a misspelled word, the partial edit result is compared with strings in the dictionary prefix tree and the last character edit is discarded if a search of the prefix tree indicates that no valid word in the dictionary includes such a prefix string.

Each edit to the misspelled word that results in a valid string in the dictionary is added to a list of possible suggestions. The list entries are then scored and a pre-determined number of suggestions with the highest score are displayed when the user requests for correction suggestions for the misspelled word.

A user is provided with tools to request for suggestions. Some embodiments provide a novel user interface to present the list of suggestions to the user. In these embodiments, the user is not required to get a context menu by using the secondary selection tool of a selection device (what is commonly referred to as a right click and involves using the secondary selection option of device such as a mouse or a touchpad to display a pop up menu). Instead, the user interface recognizes a misspelled word and when the user uses the primary selection tool of a selection device (e.g., the primary button of a mouse) to select a misspelled word, the list of suggestions is displayed. The user is then provided with the option to select one of the suggestions or leave the word as is.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
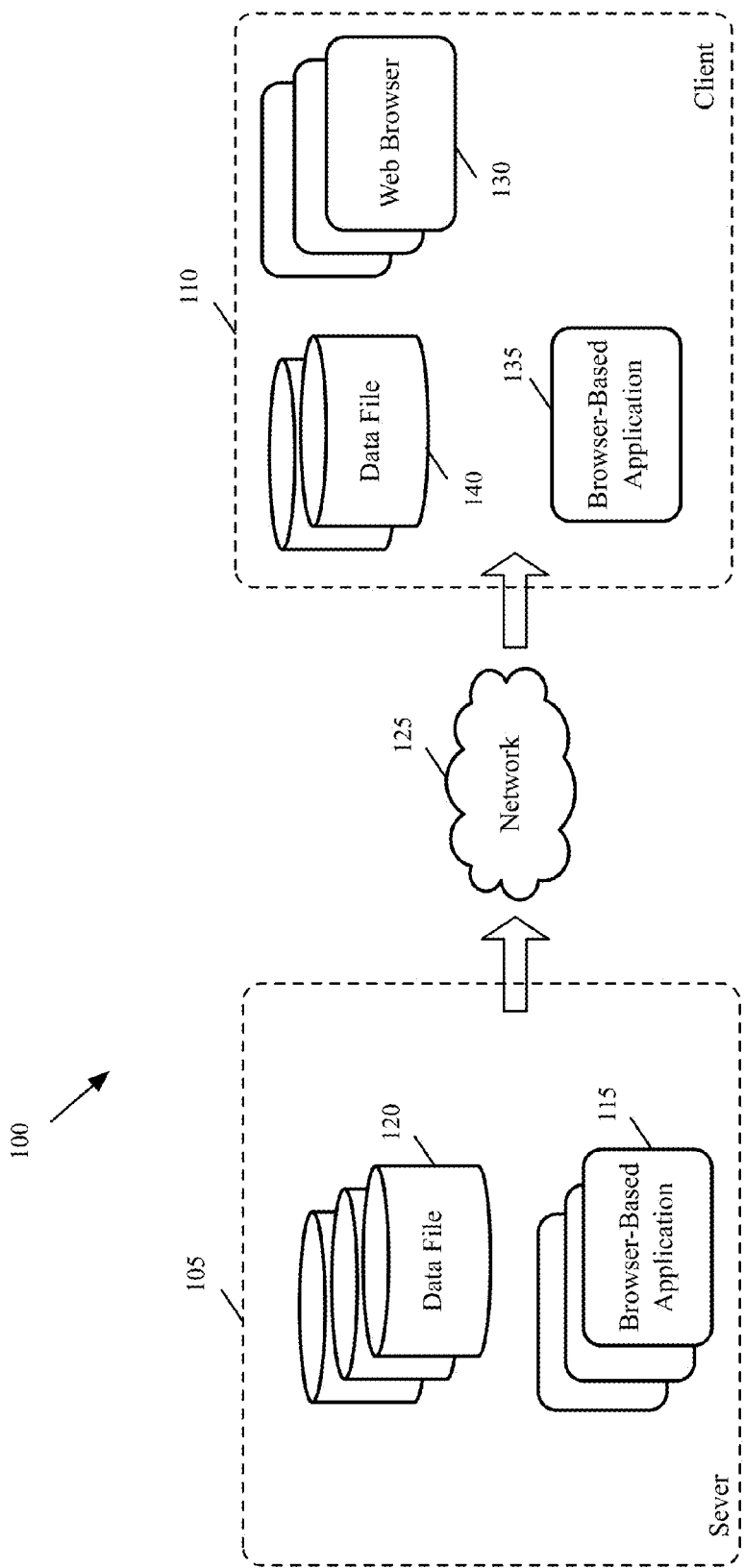
FIG. 1 conceptually illustrates a client-server system in some embodiments of the invention.

FIG. 1 conceptually illustrates a client-server system 100 in some embodiments of the invention. The system includes one or more server devices 105 and one or more client devices 110, one of each is shown for convenience. The client 110 and the server 105 are connected through a network 125 such as the Internet. As shown, the server 105 includes several browser-based applications 115. Users of the client devices are provided with access to these applications. The server also includes storage for storing client data files 120.

Client devices 110 include one or more web browsers 130 such as Safari®, Internet Explorer®, Chrome®, Firefox®, etc. The users of the client devices access the applications 115 through a web browser. As shown in FIG. 1, client device 110 has requested access to browser-based application 135 and has downloaded this application from the server 105. In some embodiments, the browser-based application 135 is run as a browser application on the client.

The client devices create and/or download one or more data files 140 from the server. Users of client devices manipulate the data files 140 by using the browser-based application 135. Once the user is done manipulating the data files, the data files are stored locally and/or uploaded to the server for future use.

Many applications such as text editors, spreadsheet generators, presentation software, etc., involve text manipulations and require a mechanism for identifying spelling errors and providing spelling suggestions. One option is to send each word to the server and utilize the server's computing and storage resources to perform spell checking. This option, however, suffers from delays involved in sending the words to the server and getting the spelling errors and suggestions back from the server.

Figure 2:
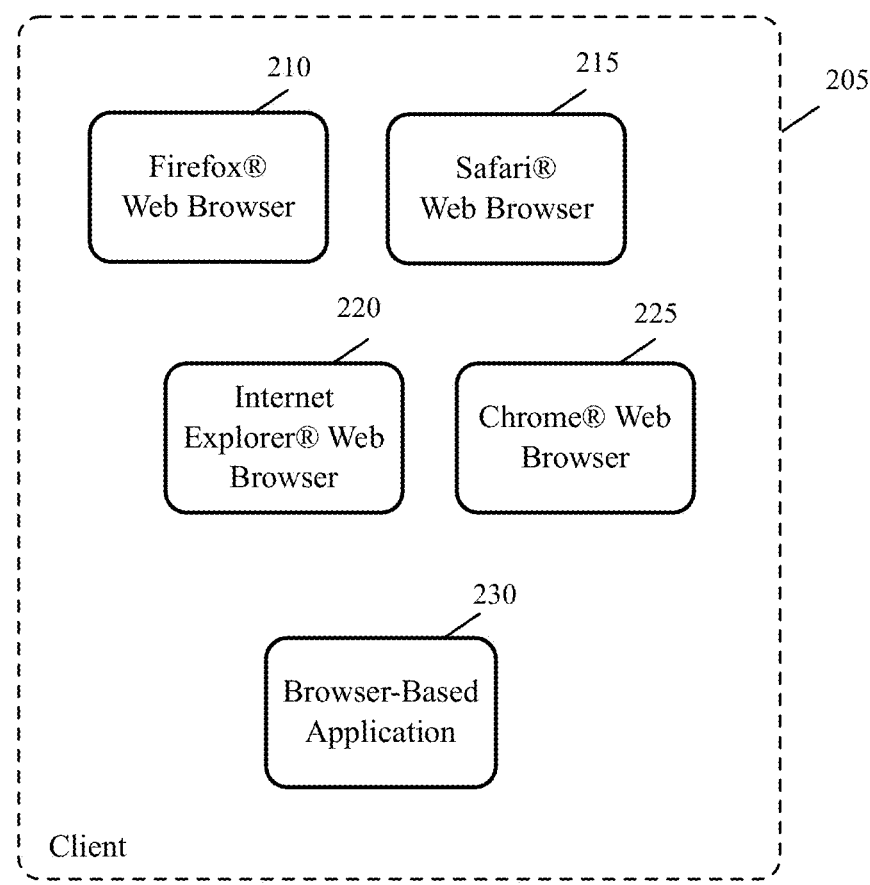
FIG. 2 conceptually illustrates a client device that does spell checking for browser-based applications according to prior art.

Another option is using spell checkers provided by browsers. Although many browsers have embedded spell checkers, each browser provides a different user interface, a different dictionary, and a different set of suggestions. The user, therefore, may not have a uniform experience for detecting and correcting the same errors when using different browsers. FIG. 2 conceptually illustrates a client device 205 that does spell checking for browser-based applications according to prior art. As shown, the client device 205 includes several browsers 210-225 (e.g., Firefox®, Safari®, Internet Explorer®, and Chrome®, respectively).

In this example, a browser-based application 230 (e.g., Gmail®) is accessed by one of the browsers. The user then uses a user-interface provided by the browser-based application 230 to perform text manipulation (e.g., to compose an email). Since each browser provides a different spell checker and a different user interface, the user will have different spell checking experience when different browsers are used, even though the same browser-based application 230 is used to correct the same error.

Figure 3:
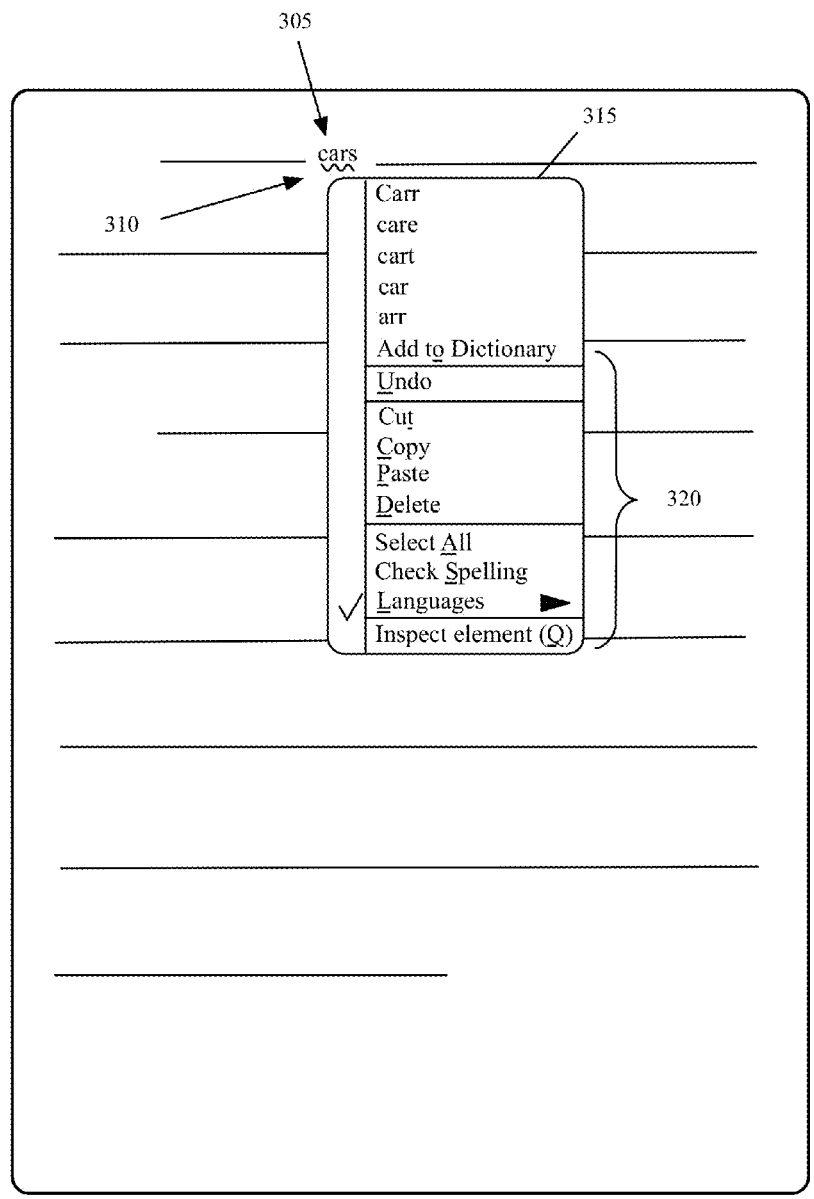
FIG. 3 shows the suggestions to correct the misspelled word "carr" when a first web-browser is used to access a browser-based application.

FIG. 3 shows suggestions to correct the misspelled word "can" when Firefox® web-browser 210 is used to access browser-based application 230. The misspelled word 305 is underscored by a wave mark 310 and a drop down list 315 that includes 5 suggestions "Carr," "care," "cart," "car," and "an" is displayed. In addition, the drop down list 315 includes a variety of other options 320, some of which might be greyed out and inaccessible because they are not applicable to correction of the spelling error.

Figure 4:
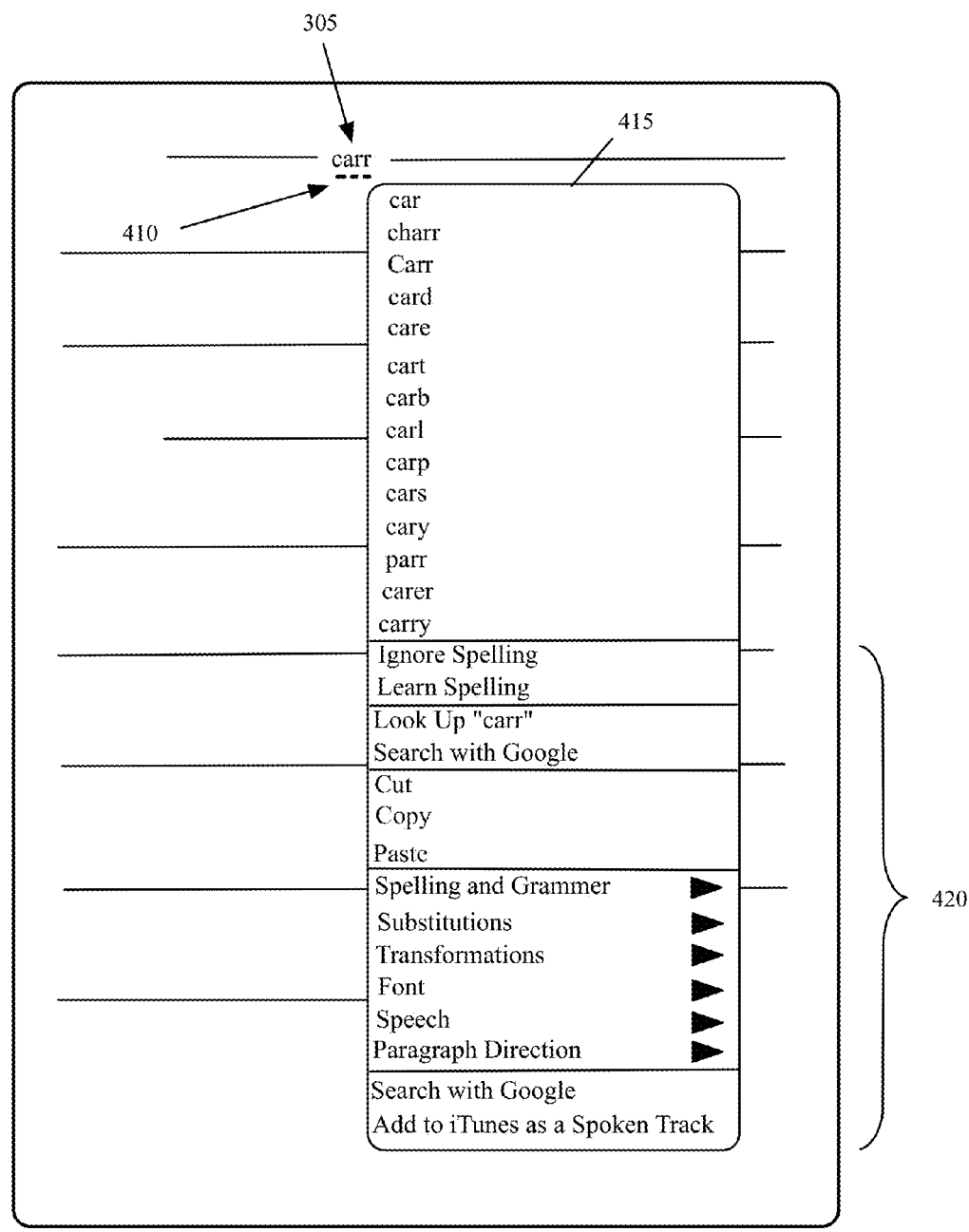
FIG. 4 shows the suggestions to correct the misspelled word "carr" when a second web-browser is used to access a browser-based application.

FIG. 4 shows the suggestions to correct the same misspelled word "can" when Safari® web-browser 215 is used to access browser-based application 230. The misspelled word 305 is underscored by a dotted line 410 and a drop down list 415 that includes 14 suggestions "car," "charr," "Carr," "card," "care," "cart," "carb," "carl," "carp," "cars," "cary," "parr," "carer," and "carry" is displayed. In addition, the drop down list 415 includes other options 420, some of which might be greyed out and inaccessible because they are not applicable to correction of the spelling error.

As is clearly shown in the examples of FIGS. 3 and 4, the user has completely different spell checking experiences when the same application is accessed through different browsers. Since the browser-based application 230 uses the browser's spell checker, the number of suggested corrections, the other options provided in the drop down lists, and even the way the misspelled word is underscored are different.

Some embodiments of the invention do not use the browsers' spell checker and provide a spell checker that is used across different browser platforms and operating systems. In these embodiments, the spell checking is performed by the same spell checker on the client side, which allows a uniform user experience regardless of which browser is utilized to access the application 135. Since the misspelled words are not sent to the server to check, the network latencies are avoided and spell checking continues to function when the browser is disconnected from the network (e.g., the Internet) or the backend server. In some of these embodiments, the spell checker is written in a language such as JavaScript, which is executable by browsers. For instance, in some embodiments, the spell checker is a part of browser-based application 135, which is installed as a browser plug-in.

Figure 5:
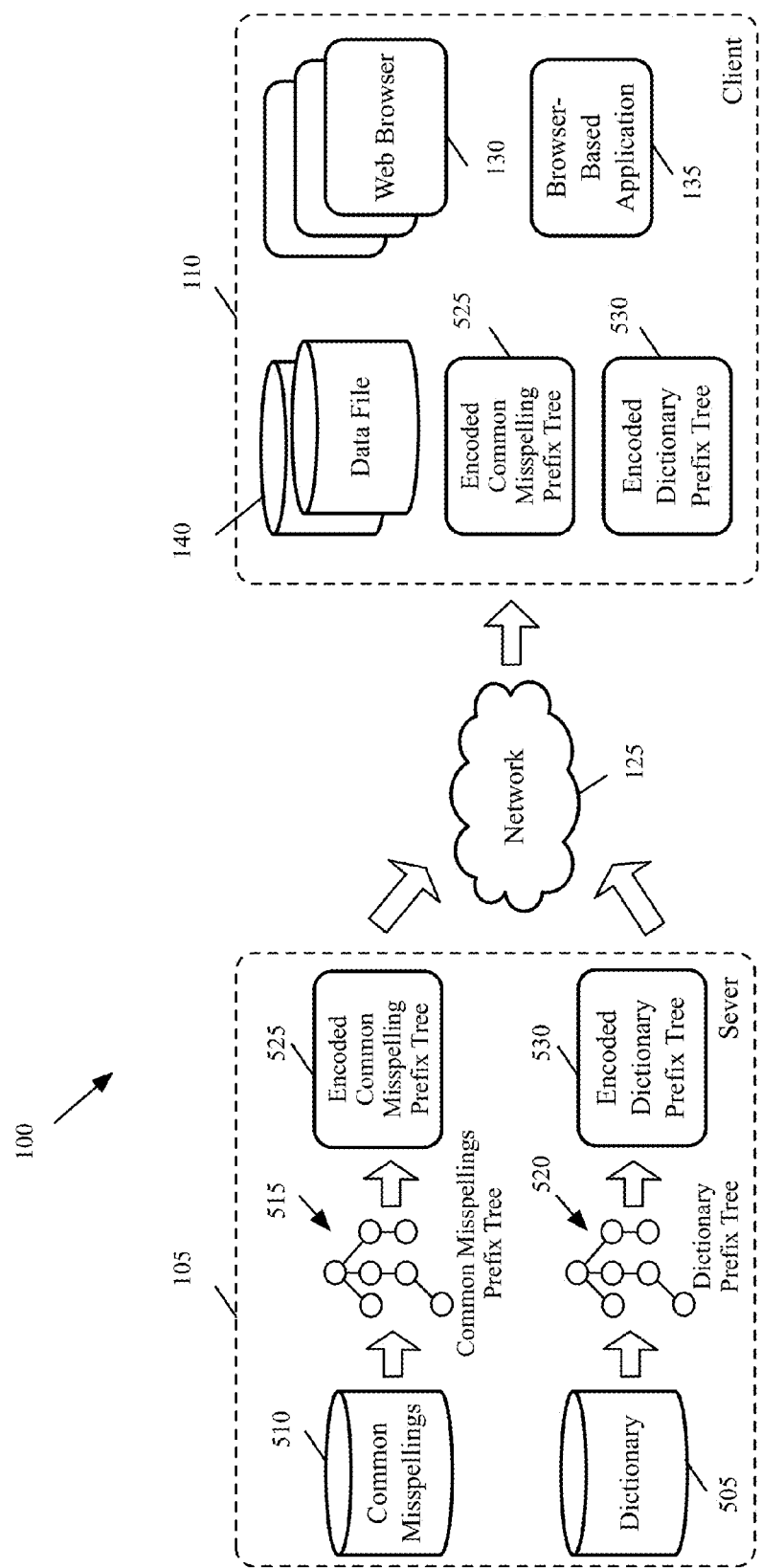
FIG. 5 conceptually illustrates the client-server system of FIG. 1 after a browser-based application that manipulates text is downloaded from the server.

Spell checking in any language requires a list of the words that are correctly spelled in that language. The list may also require periodic updates as new technical, scientific, and other terms are added to the language. FIG. 5 conceptually illustrates the client-server system 100 of FIG. 1 after a browser-based application 135 such as an editor, a spreadsheet application, or a presentation application that manipulates text is downloaded from the server.

As shown, the server 105 maintains a spelling dictionary 505 and a set of common misspellings 510. The dictionary includes a list of the correct spelling for the words in the language (e.g., English) that is used by application 135 to perform spell checking. The set of common misspellings 510 includes a list of commonly misspelled words and their corresponding correct spelling (or spellings). For instance, groups of words such as (allways, always), (almsot, almost), (alos, also), (borded, boarded, bordered, border) where a commonly misspelled word such as allways is paired with the correct spelling "always" and a commonly misspelled word such as "borded" is paired with several possible correct spellings "boarded," "bordered," and "border." As shown, the server 105 creates data structure 530 from the dictionary 505 and a data structure 525 from the common misspellings 510.

Figure 6:
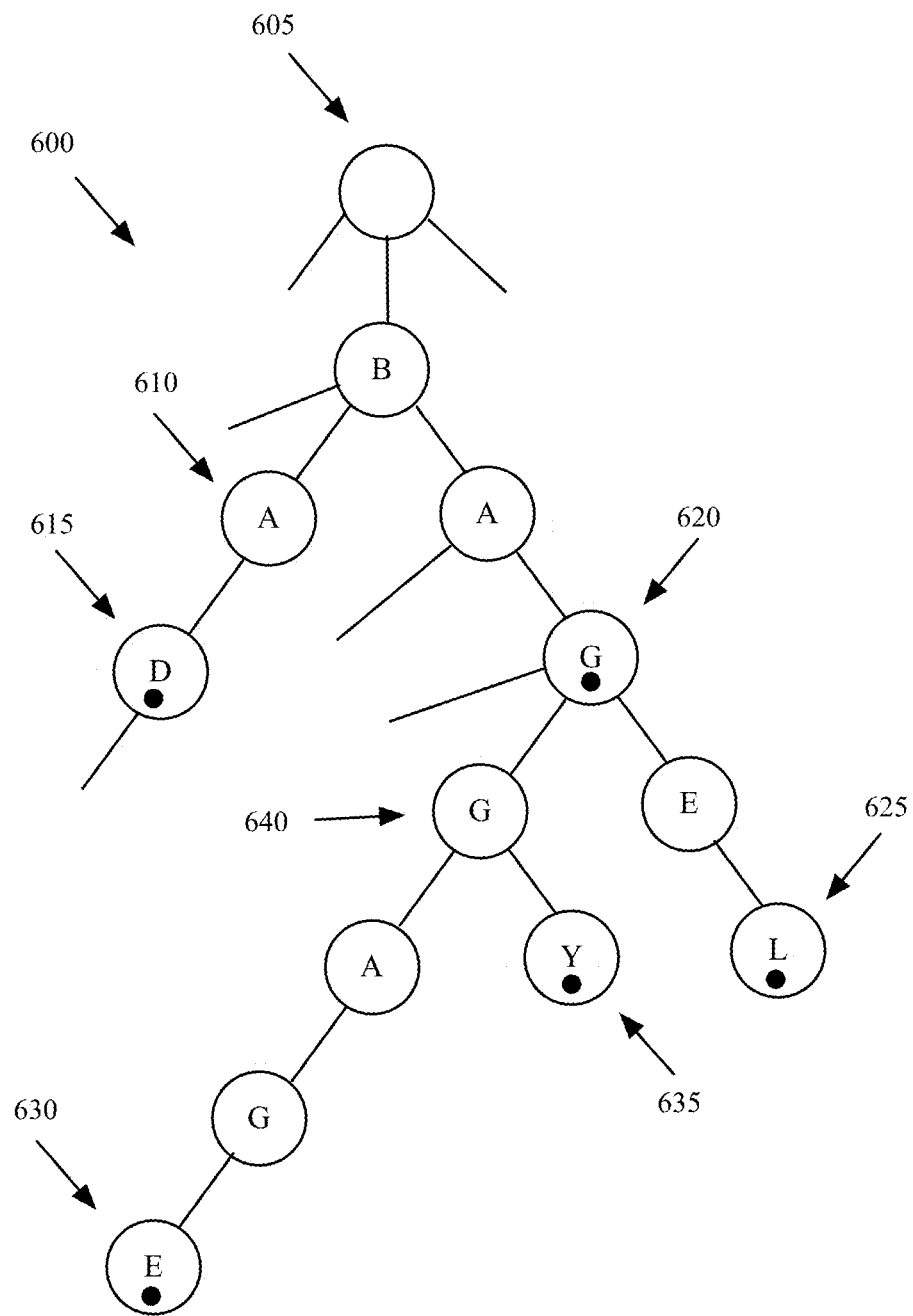
FIG. 6 conceptually illustrates a portion of a dictionary prefix tree in some embodiments of the invention.

In some embodiments, these data structures are prefix trees. A prefix tree (or trie) is an ordered tree data structure where the keys are strings. The position of a node in the tree defines the key with which the node is associated. In a prefix tree, all descendants of a node have a common prefix of the string associated with that node and the root is associated with the empty string. FIG. 6 conceptually illustrates a portion 600 of a dictionary prefix tree in some embodiments of the invention. As shown, each node in the tree other than the root node is associated with a character. Furthermore, the root node 605 is associated with empty string and each node in the tree is associated with a string that starts from the root node 605 and ends to that node. For instance, node 610 is associated with string "ba" that is not a valid English word. Other nodes such as nodes 615-635 are associated with valid English words "bad," "bag," "bagel", "baggage," and "baggy," respectively. These nodes are conceptually marked with a black dot on the tree to identify them as nodes associated with valid words. Some embodiments internally flag these nodes in the data structure that represents the prefix tree.

Some embodiments utilize the dictionary prefix tree not only to determine whether a word is misspelled but also to provide suggestions to correct the spelling. As described further below, some embodiments add, replace, or delete characters from a misspelled word in order to arrive to a word with correct spelling. These embodiments utilize the dictionary prefix tree to check the partial results after each add, replace, or delete to pursue only the changes that potentially result in a valid word.

Since the prefix trees are considerably large and would incur additional network bandwidth cost if the trees were sent in a raw format to the client 110. Some embodiments encode and compress the prefix trees into a more compact format before sending the trees to the client. The encoding is designed to reduce the network transfer size, the memory footprint, and the workload on the client when the client decodes the trees. As shown in FIG. 5, server 105 sends the encoded trees 525 and 530 to the client 110 through the network 125.

Figure 7:
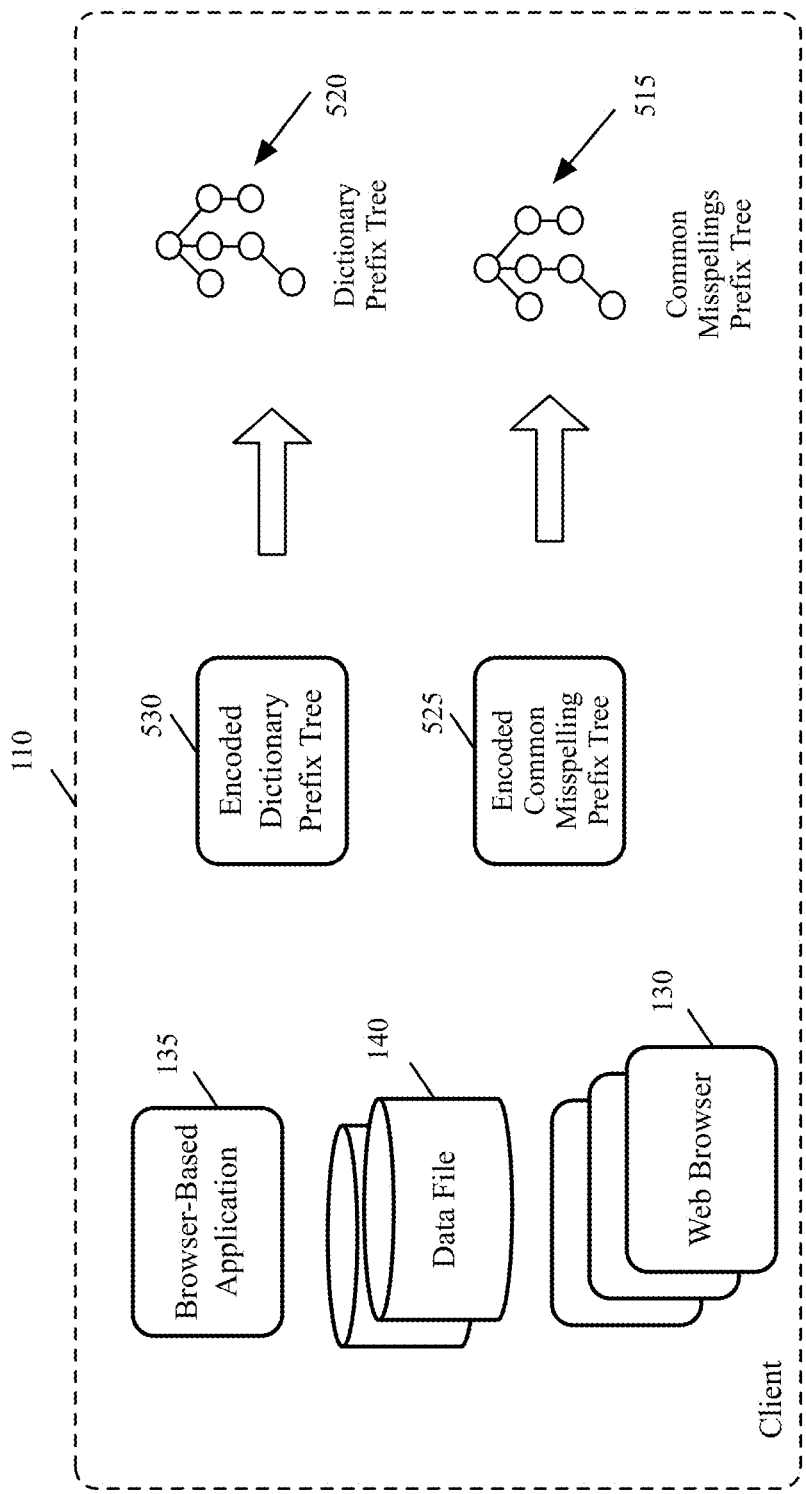
FIG. 7 conceptually illustrates the client device of FIG. 5 after the client receives the encoded data structure for the dictionary and the list of common misspellings from the server in some embodiments of the invention.

FIG. 7 conceptually illustrates the client device of FIG. 5 after the client 110 receives the encoded dictionary data structure 525 and the encoded common misspelling data structure 525 from the server. The client 110 decodes the encoded dictionary prefix tree 530 to build the dictionary prefix tree 520. The client 110 also decodes the encoded common misspelling prefix tree 525 to build the common misspelling prefix tree 515. Some embodiments delete the encoded prefix trees after the prefix trees are created. Some embodiments keep the encoded prefix trees (or the decoded prefix trees) in browser cache on the client device 110. In these embodiments, the cache is updated from the server according to the browser rules for updating the cache. Therefore, as long as the encoded prefix trees (or the decoded prefix trees) are not expired in cache, the prefix trees are created (or reused) when the application is run in the browser without requiring the encoded prefix trees to be downloaded from the server.

Within the prefix tree, every tree node has at least three pieces of information: the character associated with the node, the node children, and a flag (or a bit) identifying whether the string associated with the node is a valid word. To represent the tree structure, a node identification (node ID) is assigned to each node in a breath first manner. Starting from the root tree node, the root node is given a node ID of 0. The root children are then assigned node ID of 1, 2, . . . k from left to right, where k is the number of first-level node in the node.

Figure 8:
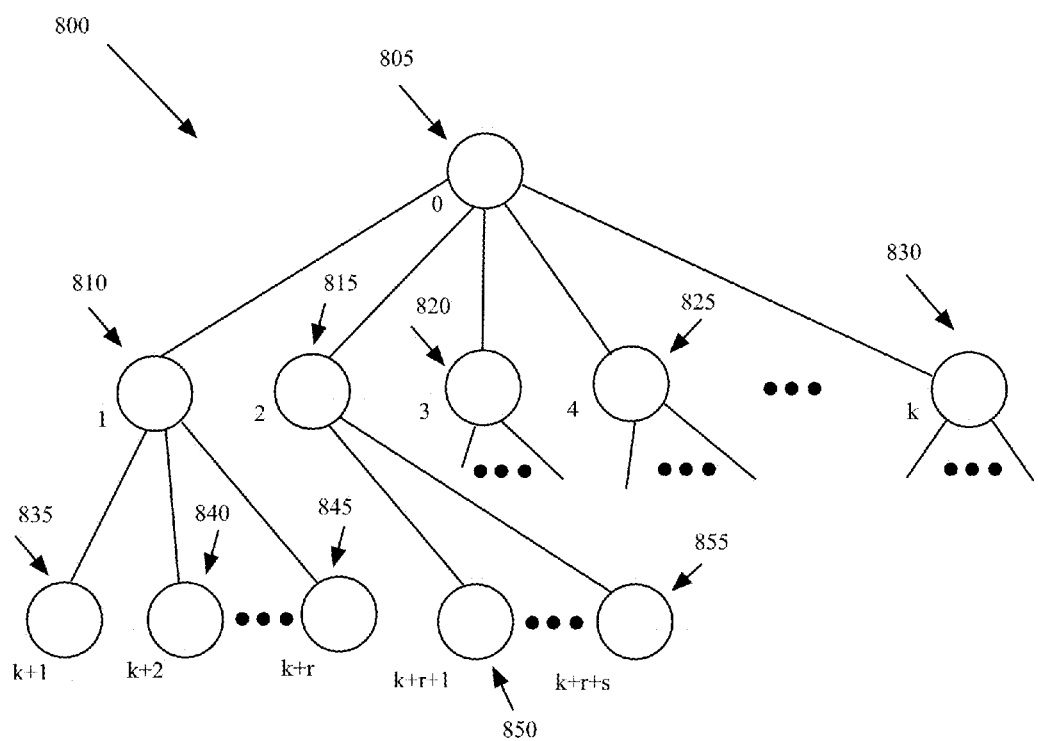
FIG. 8 conceptually illustrates a portion of a prefix tree in some embodiments of the invention.

FIG. 8 conceptually illustrates a portion 800 of a prefix tree in some embodiments of the invention. As shown, the root node 805 has a node ID of 0 and the root node direct children (first level nodes) 810-830 have node IDs 1-k, respectively. The assignment is then repeated with the second-level node from left to right, keeping the same order. As such, the children 835-845 of "node 1" 810 (the first child of the root node) have ID's k+1, k+2, . . . k+r, where r is the number of children of node 1. Similarly, the children of "node 2" 815 (the second child of the root node) have ID's k+r+1, k+r+2, . . . k+r+s where s is the number of children of node 2.

With this Node ID assignment scheme, all children of any node are automatically grouped together. To represent all the parent-child relationships in the prefix, for each node i, it suffices to only store the node ID of the left-most child left_child_index[i] and the number of children num_children[i]. Using the example above, left_child_index[0]=1, num_children[0]=k. Similarly, left_child_index[1]=k+1, num_children[1]=r, left_child_index[2]=k+r+1, num_children[2]=s, etc. Following this pattern, for every node i, the left_child_index[i]+num_children[i]=left_child_index[i+1]. With this premise some embodiments encode the whole tree structure by storing a list of number of children, ordered by the node ID. The left_child_index array can be recovered mathematically.

To minimize network transfer and take advantage that the number of children of any node is reasonably capped, some embodiments encode each entry in num_children with a simple ASCII character. For the characters in the tree nodes, some embodiments concatenate all node characters, ordered by the node ID, into a single string to be sent to the client. The valid word bits are also concatenated accordingly. These bits are packed into bytes (8 bits per byte), and encoded using the Base64 encoding scheme in some embodiments. Base64 encoding represents binary data in an ASCII string format by translating the data into a radix-64 representation. The preceding technique produces three long strings of ASCII characters, which can be effectively compressed further with a lossless data compression algorithm such the deflate algorithm.

On the client side, the characters, bits and left_child_index are recovered in reverse steps. To further compress the amount of client memory in storing the left child indices, some embodiments encode the numbers into two 16-bit characters and directly store them in a long string. Empirically, this amounts to a 60% saving of the data size compared to storing it as a regular number array, while losing only minimal efficiency.

Figure 9:
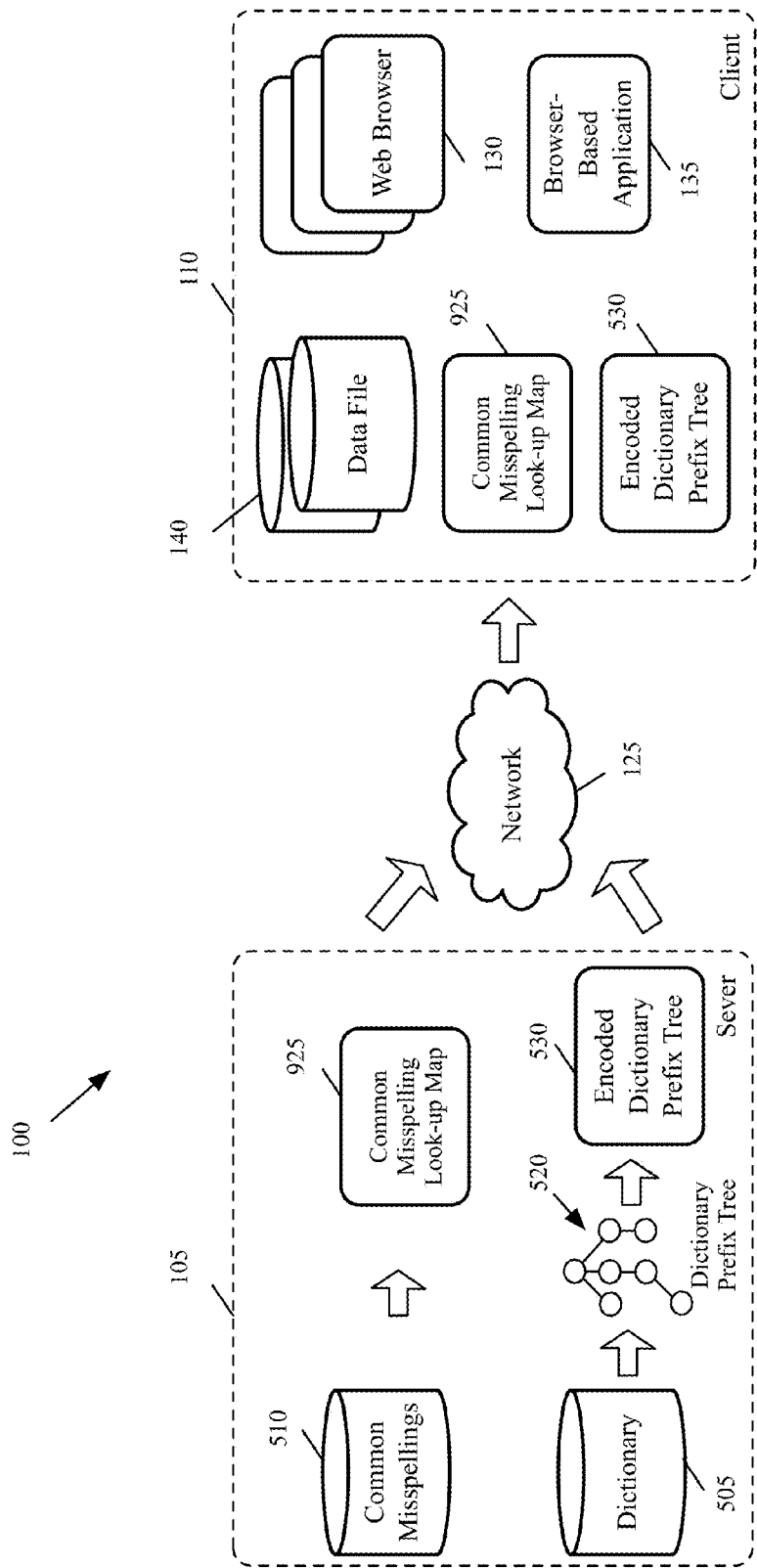
FIG. 9 conceptually illustrates an alternative embodiment of the client-server system of FIG. 1 after a browser-based application that manipulates text is downloaded from the server.
Figure 10:
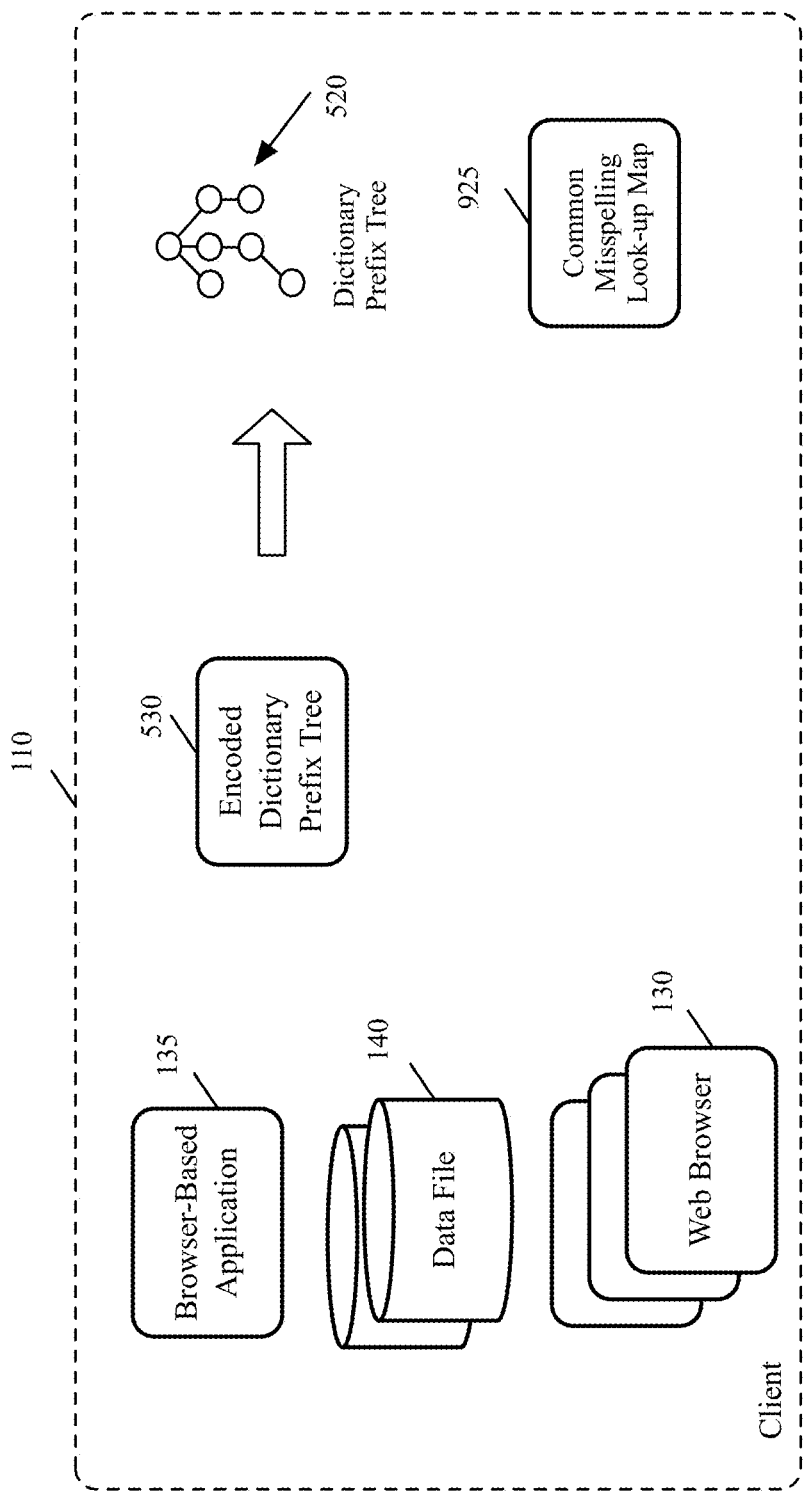
FIG. 10 conceptually illustrates the client device of FIG. 9 after the client receives the encoded data structure for the dictionary and the list of common misspellings from the server.

FIGS. 9 and 10 illustrate another alternative embodiment for sending the dictionary and the list of common misspellings from the server to the client. FIG. 9 conceptually illustrates the client-server system 100 of FIG. 1 after a browser-based application 135 such as an editor, a spreadsheet application, or a presentation application that manipulates text is downloaded from the server. As shown, the server 105 maintains a spelling dictionary 505 and a set of common misspellings 510. As shown in FIG. 9, server 105 has encoded the dictionary prefix tree 520 and sends the encoded tree 530 to the client 110 through the network 125. In this embodiment, the server creates a look-up map 925 for the common misspelling list and sends the look-up map to the client. In some embodiments, the server also encodes and compresses the look-up map prior to sending the look-up map to the client. In other embodiments, the server does not encode the look-up map.

FIG. 10 conceptually illustrates the client device of FIG. 9 after the client 110 receives the encoded dictionary data structure 530 and the common misspelling data structure 925 from the server. The client 110 decodes the encoded dictionary prefix tree 530 to build the dictionary prefix tree 520. The client 110 uses the look-up map common misspelling prefix tree 925 to search for common misspellings. In the embodiments that the server encodes the look-up map, the client decodes (not shown) the look-up map. Some embodiments delete the encoded prefix tree and the encoded look-up map after the prefix trees are created. Some embodiments keep the look-up map and the encoded prefix tree (or the decoded prefix trees) in browser cache on the client device 110. In these embodiments, the cache is updated from the server according to the browser rules for updating the cache. Therefore, as long as the look-up map and the encoded prefix tree (or the decoded prefix trees) are not expired in cache, the look-up map is reused and the prefix tree is created (or reused) when the application is run in the browser without requiring the data structures to be downloaded from the server.

Figure 11:
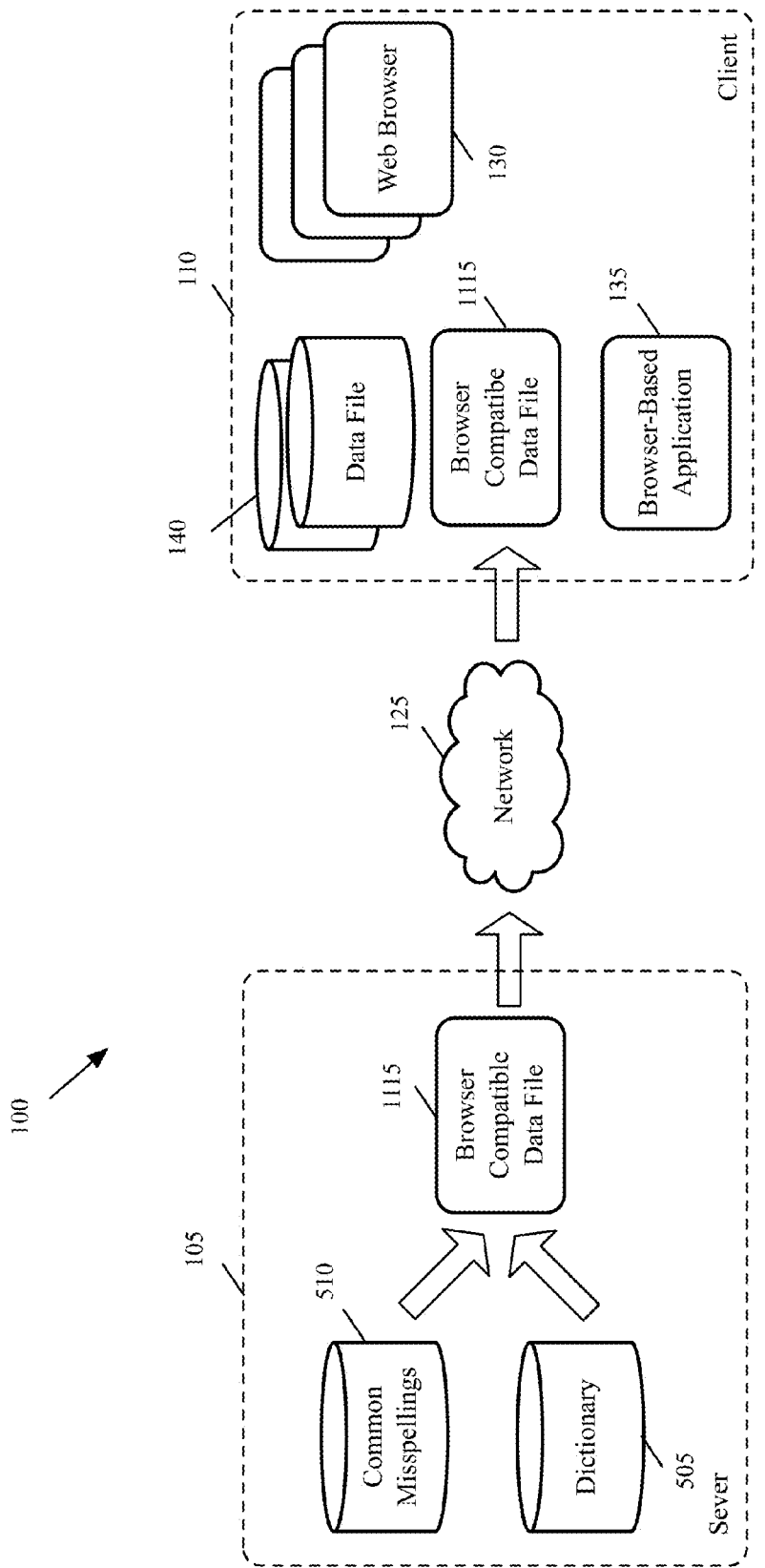
FIG. 11 conceptually illustrates an alternative embodiment of the client-server system of FIG. 1 after a browser-based application that manipulates text is downloaded from the server.
Figure 12:
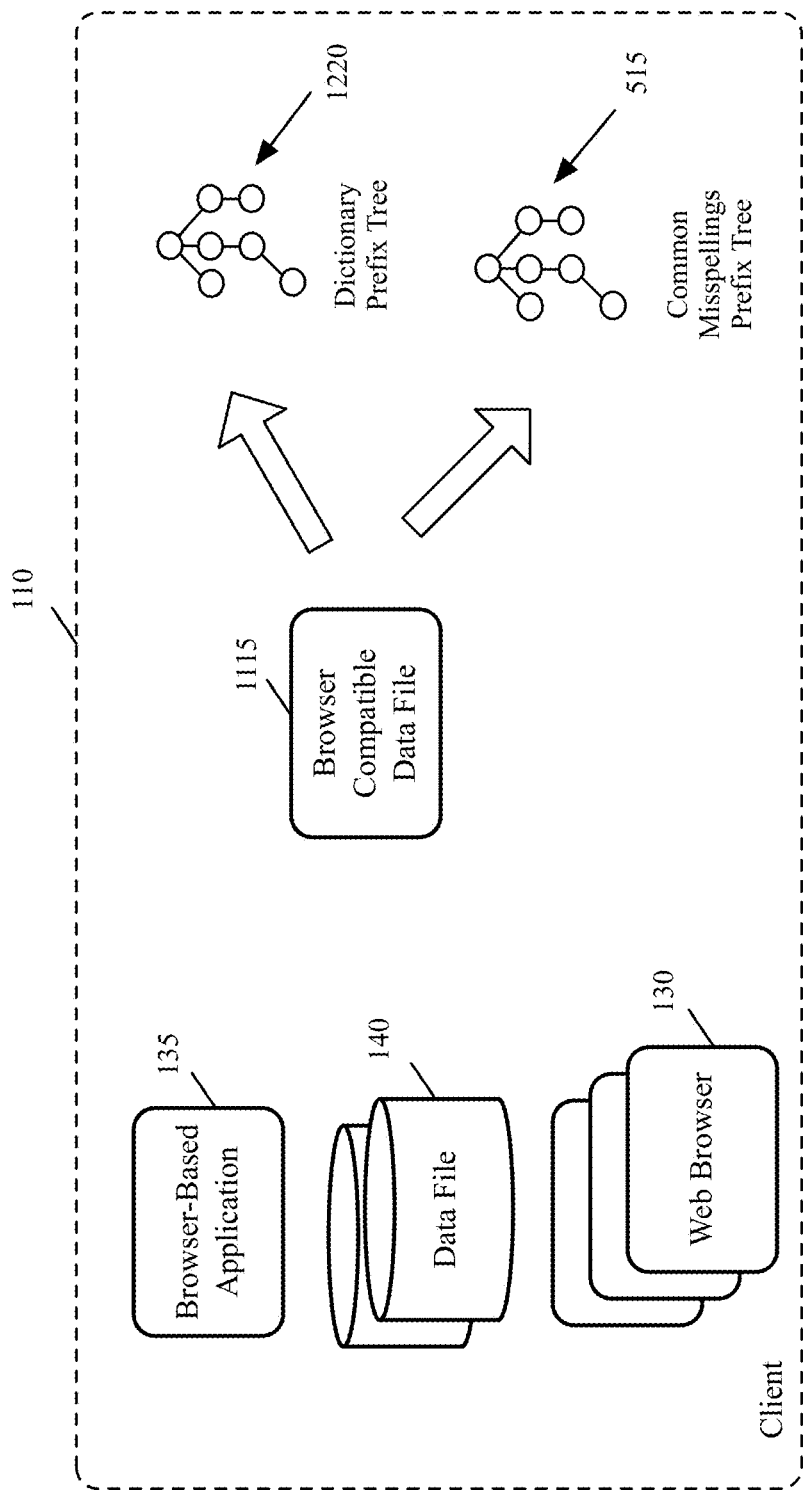
FIG. 12 conceptually illustrates the client device of FIG. 11 after the client receives a browser compatible data file that includes the dictionary and the list of common misspellings from the server.

FIGS. 11 and 12 illustrate yet another alternative embodiment for sending the dictionary and the list of common misspellings from the server to the client. FIG. 11 conceptually illustrates the client-server system 100 of FIG. 1 after a browser-based application 135 such as an editor, a spreadsheet application, or a presentation application that manipulates text is downloaded from the server. As shown, the server 105 maintains a spelling dictionary 505 and a set of common misspellings 510. The dictionary includes a list of the correct spelling for the words in the language (e.g., English) that is used by application 135 to perform spell checking. As shown, the dictionary 505 and the common misspellings 510 are included in a browser compatible data file 1115 such as a JavaScript file and are sent to the client 110.

FIG. 12 conceptually illustrates the client device of FIG. 11 after the client receives a browser compatible data file that includes the dictionary and the list of common misspellings from the server. The browser compatible data file 1115 is used to build a prefix tree 1220 for the dictionary and a prefix tree 515 for the common misspellings. In the embodiments that utilize a look-up map instead of a prefix tree for common misspellings, the client extracts the look-up map from the browser compatible data file. In alternative embodiments, the client receives a list of common misspellings in the browser compatible file and creates the look-up map at the client.

Some embodiments delete the browser compatible data file after the prefix trees are created. Some embodiments keep the browser compatible data file (or the data for the dictionary and the common misspellings contained in the browser compatible data file) in browser cache on the client device 110. In these embodiments, the cache is updated from the server according to the browser rules for updating the cache. Therefore, as long as the browser compatible data file (or the data for the dictionary and the common misspellings contained in the browser compatible data file) are not expired in cache, the prefix trees are created when the application is run in the browser without requiring the browser compatible data file to be downloaded from the server.

Several more detailed embodiments of the invention are described in sections below. Section I describes identifying spelling errors in a web-based document creation and manipulation system in some embodiments. Next, Section II describes providing correction suggestions for misspelled words in some embodiments of the invention. Section III describes a novel user interface for displaying spelling suggestions and receiving user selections. Section IV describes the software architecture of some embodiments. Finally, a description of an electronic system with which some embodiments of the invention are implemented is provided in Section V.

Figure 13:
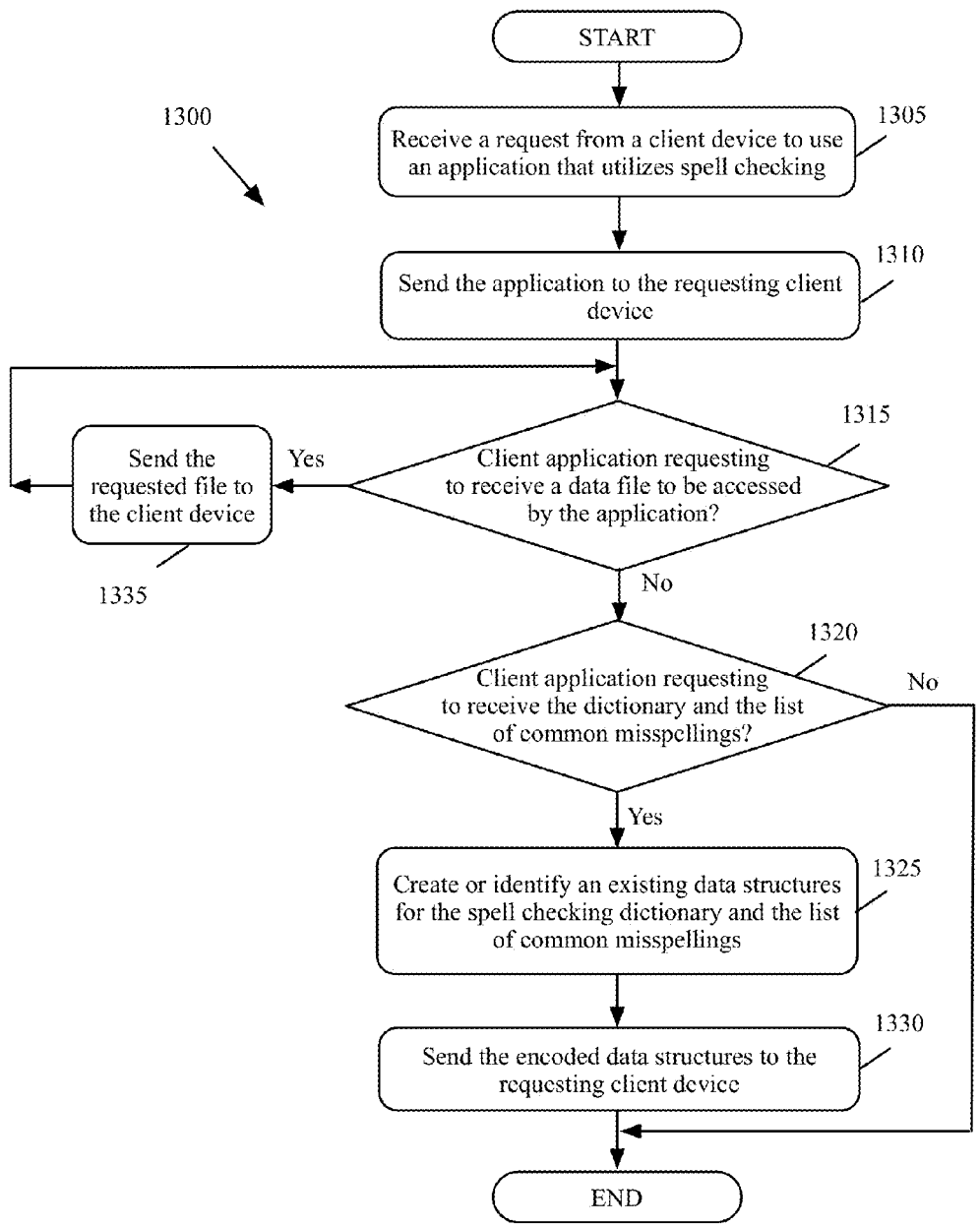
FIG. 13 conceptually illustrates a process for sending an application and associated files from a server to a client in some embodiments of the invention.

I. Identifying Spelling Errors in a Web-Based Document Creation and Manipulation System FIG. 13 conceptually illustrates a process 1300 for sending an application and associated files from a server to a client in some embodiments of the invention. As shown, the process receives (at 1305) a request from a client device to use an application that utilizes spell checking. For instance, a user of the client device 110 in FIG. 1 uses one of the client browsers 130 to access a web page provided by the server 105 and requests access to a word processing application. Next, process 1300 sends (at 1310) the requested application to the client. For instance, the server sends the application 135 in FIG. 1 as a plug-in or other browser executable form to the client.

Next, the process determines (at 1315) whether the client device is requesting to receive a data file to be accessed by the application. For instance, the user of client device 110 in FIG. 1 uses the provided application 135 to edit a data file previously stored on the server. If the client device is requesting a data file, the process sends (at 1335) the requested data file to the client. The process then proceeds to 1315, which was described above. Otherwise, the process determines (at 1320) whether the client device is requesting to receive the dictionary and the list of common misspellings. For instance, when the user opens the browser-based application 135, the application determines whether copies of previously generated prefix trees for the dictionary and the look-up map (or prefix tree) for the common misspellings are still available in browser cache. If not, the application (through the browser) requests a copy of the dictionary and common misspelling files from the server.

When the client application is not requesting to receive the dictionary and common misspelling files, the process ends. Otherwise, at 1325, the process creates the data structures (or uses an existing version of each data structure if the information in the data structures are still valid) for the spell checking dictionary and common misspellings. In some embodiments, the data structure for the spell checking is a prefix trees. In some embodiments, the data structure for the common misspellings is also a prefix tree. In other embodiments, the data structure for common misspellings is a look-up map. The process then encodes the spell checking dictionary prefix tree. In the embodiments that utilize a prefix tree for common misspellings, the server also encodes the common misspellings prefix tree. In some embodiments, the request from the client application also indicates the language used by the user. Process 1300 utilizes the language information to send the proper dictionary and common misspelling files. The process then sends (at 1330) the encoded data structures to the client device. The process then ends.

In the embodiments that build the prefix trees on the client side (as described by reference to FIGS. 11 and 12, above), process 1300 replaces operations 1320 and 1330 with the following operations. The process includes (at 1325) the spell checking dictionary and a list of common misspellings in one or more browser compatible files (such as one or more JavaScript files). The process then sends (at 1330) the browser compatible file (or files) to the client device in order for the client to build the corresponding data structures. The process then ends.

Figure 14:
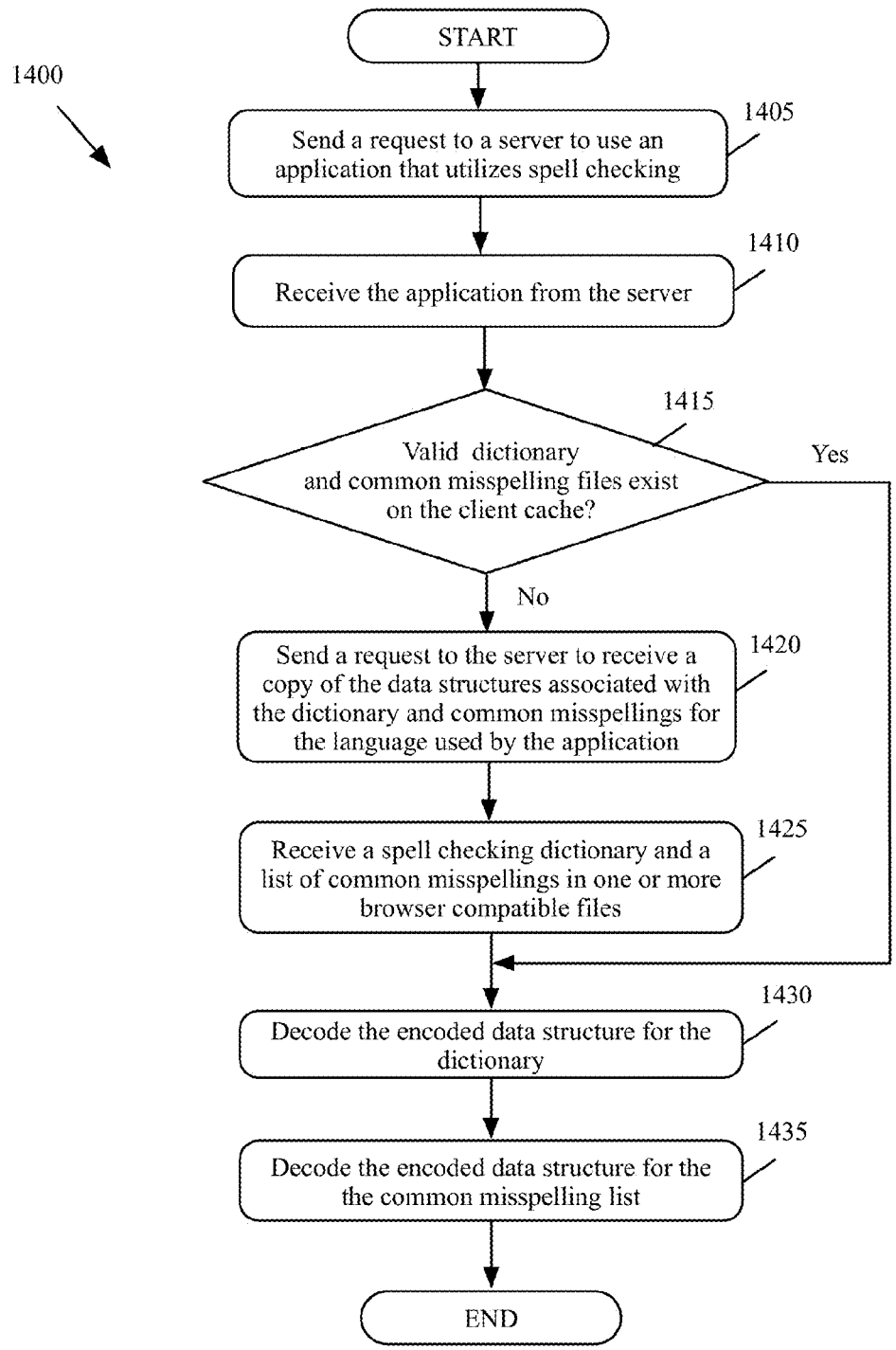
FIG. 14 conceptually illustrates a process for utilizing a web-based application on a client device in some embodiments of the invention.
Figure 15:
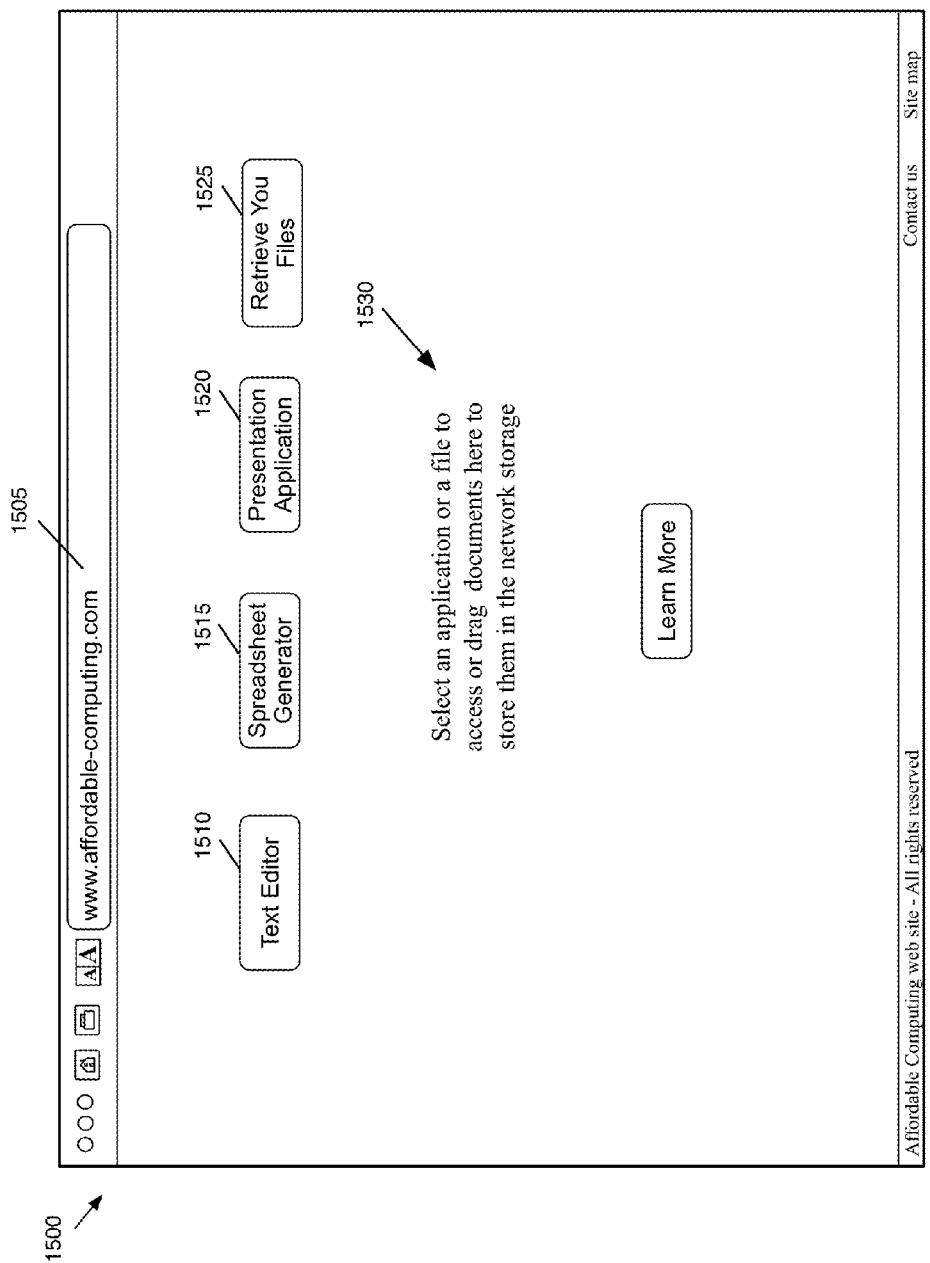
FIG. 15 illustrates an example of how a user requests an application from a server in some embodiments of the invention.

FIG. 14 conceptually illustrates a process 1400 for utilizing a web-based application on a client device in some embodiments of the invention. Process 1400 is utilized in embodiments described by reference to FIGS. 5 and 7, above. As shown, the process sends (at 1405) a request to a server to use an application that utilizes spell checking. FIG. 15 illustrates an example of how a user requests an application from a server in some embodiments of the invention. In this example, the user of a client device has used a browser to access a web page 1500 of a server that provides access to applications and remote file storage. The web page 1500 is displayed after the user has successfully signed up to the server.

As shown, the web page provides options 1510-1520 to the user to access different applications for text editing, spreadsheet generation, and presentation generation, respectively. The user is also provided with an option 1525 to retrieve files previously stored on the server and an option 1530 to store new files on the server. When the user selects one of the options 1510-1520, process 1400 sends a request to the server to use the corresponding application.

Next, process 1400 receives (at 1410) the application from the server. In some embodiments, the application includes a spell checker. In some of these embodiments the spell checker is written in a language such as JavaScript, which is executable by browsers and is installed, e.g., as a browser application. The process then determines (at 1415) whether valid dictionary and common misspelling files (e.g., the data structures associated with the corresponding prefix trees or look-up map) exist in the client. For instance, if the files are kept in browser cache, the process determines that the files are still valid. If valid copies exist, the process proceeds to 1430, which is described below. Otherwise, the process sends (at 1420) a request to the server to receive a copy of the data structures (e.g., the encoded prefix tree or look-up map) for the dictionary and the common misspelling files. The request also identifies the language used by the application to edit text editing and perform spell checking.

The process then receives (at 1425) data structures (e.g., encoded prefix trees or look-up map) associated with the spell checking dictionary and the list of common misspellings. For instance, process 1300 in the server generates the prefix trees or look-up map files (or identifies existing files) and encodes them as described by reference to FIG. 13, above.

Process 1400 then decodes (at 1430) the received dictionary data structure (e.g., encoded dictionary prefix tree) to build the dictionary prefix tree. As described by reference to FIG. 6, above, a prefix tree is an ordered tree data structure where the keys are strings. The position of a node in the tree defines the key with which the node is associated. In a prefix tree, all descendants of a node have a common prefix of the string associated with that node and the root is associated with the empty string. The process decodes (at 1435) the received common misspelling data structure (e.g., encoded common misspelling prefix tree or look-up map) to build the common misspelling prefix tree. In the embodiments that the server sends the look-up to the client without encoding the look-up map, operation 1435 is bypassed. The process then ends.

Figure 16:
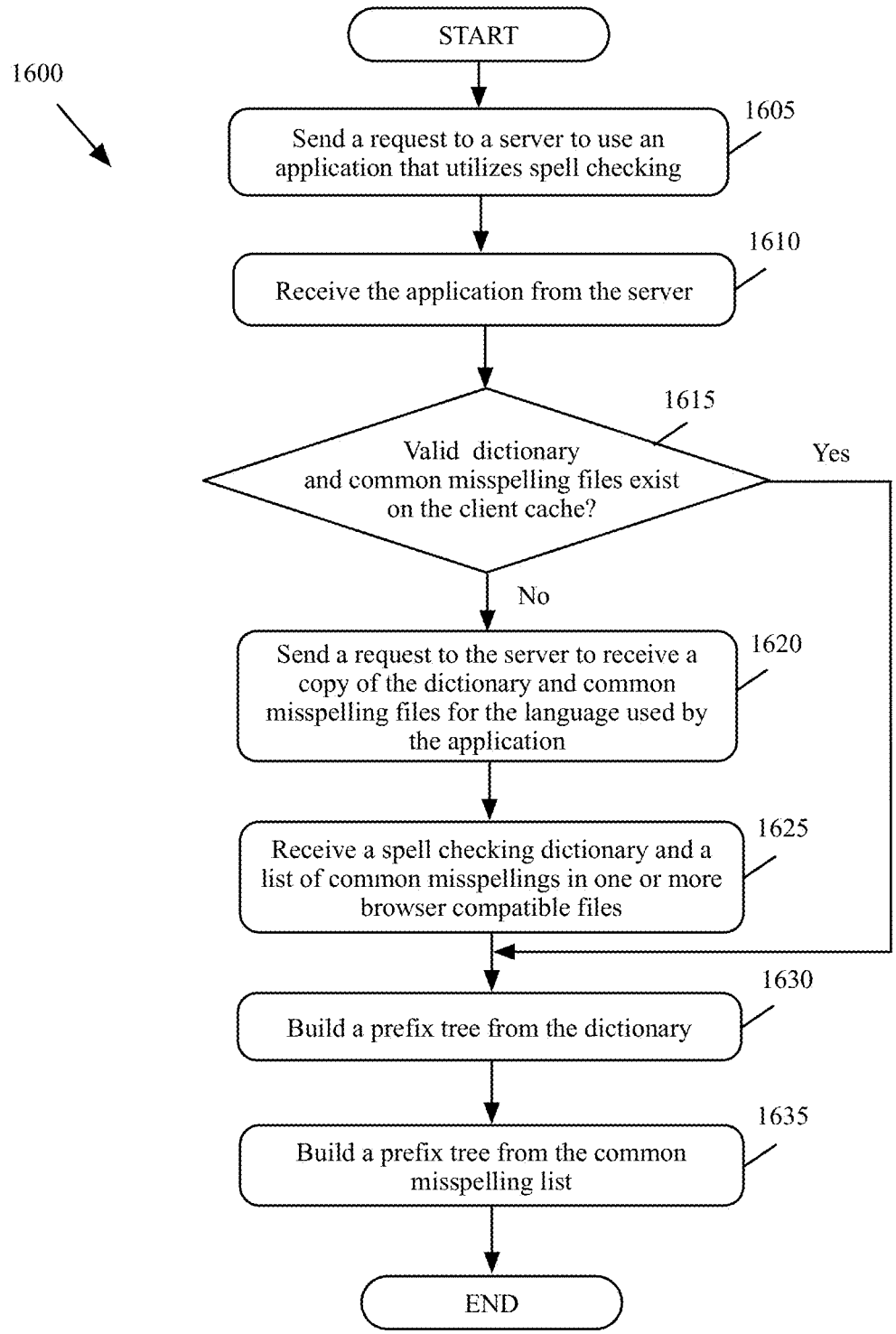
FIG. 16 conceptually illustrates a process for utilizing a web-based application on a client device in some alternative embodiments of the invention.

FIG. 16 conceptually illustrates a process 1600 in an alternative embodiment for utilizing a web-based application on a client device in some embodiments of the invention. Process 1600 is utilized in embodiments described by reference to FIGS. 11 and 12, above. As shown, the process sends (at 1605) a request to a server to use an application that utilizes spell checking. Next, process 1600 receives (at 1610) the application from the server. In some embodiments, the application includes a spell checker. In some of these embodiments the spell checker is written in a language such as JavaScript, which is executable by browsers and is installed, e.g., as a browser application.

The process then determines (at 1615) whether a valid dictionary and common misspelling files (or a valid copy of a browser compatible file that includes dictionary and common misspelling data) exists in the client. For instance, if the files are kept in browser cache, the process determines that the files are still valid. If valid copies exist, the process proceeds to 1630, which is described below. Otherwise, the process sends (at 1620) a request to the server to receive a copy of the dictionary and the common misspelling files. The request also identifies the language used by the application to edit text editing and perform spell checking.

The process then receives (at 1625) a spell checking dictionary and a list of common misspellings in one or more browser compatible files. For instance, process 1300 in the server generates a script file and includes the dictionary listing and the common misspellings in the script file. Using a compact browser compatible format such as JavaScript allows for fast transfer of the file from the server to the client.

Process 1600 then builds (at 1630) a prefix tree from the dictionary listing. As described by reference to FIG. 6, above, a prefix tree is an ordered tree data structure where the keys are strings. The position of a node in the tree defines the key with which the node is associated. In a prefix tree, all descendants of a node have a common prefix of the string associated with that node and the root is associated with the empty string. The process then builds (at 1635) a prefix tree from the common misspelling listing. In the embodiments that utilize a look-up map, operation 1635 creates the look-up map from the received common misspelling list. In the embodiments that the client receives the look-up map from the server, operation 1635 is bypassed. The process then ends.

Figure 17:
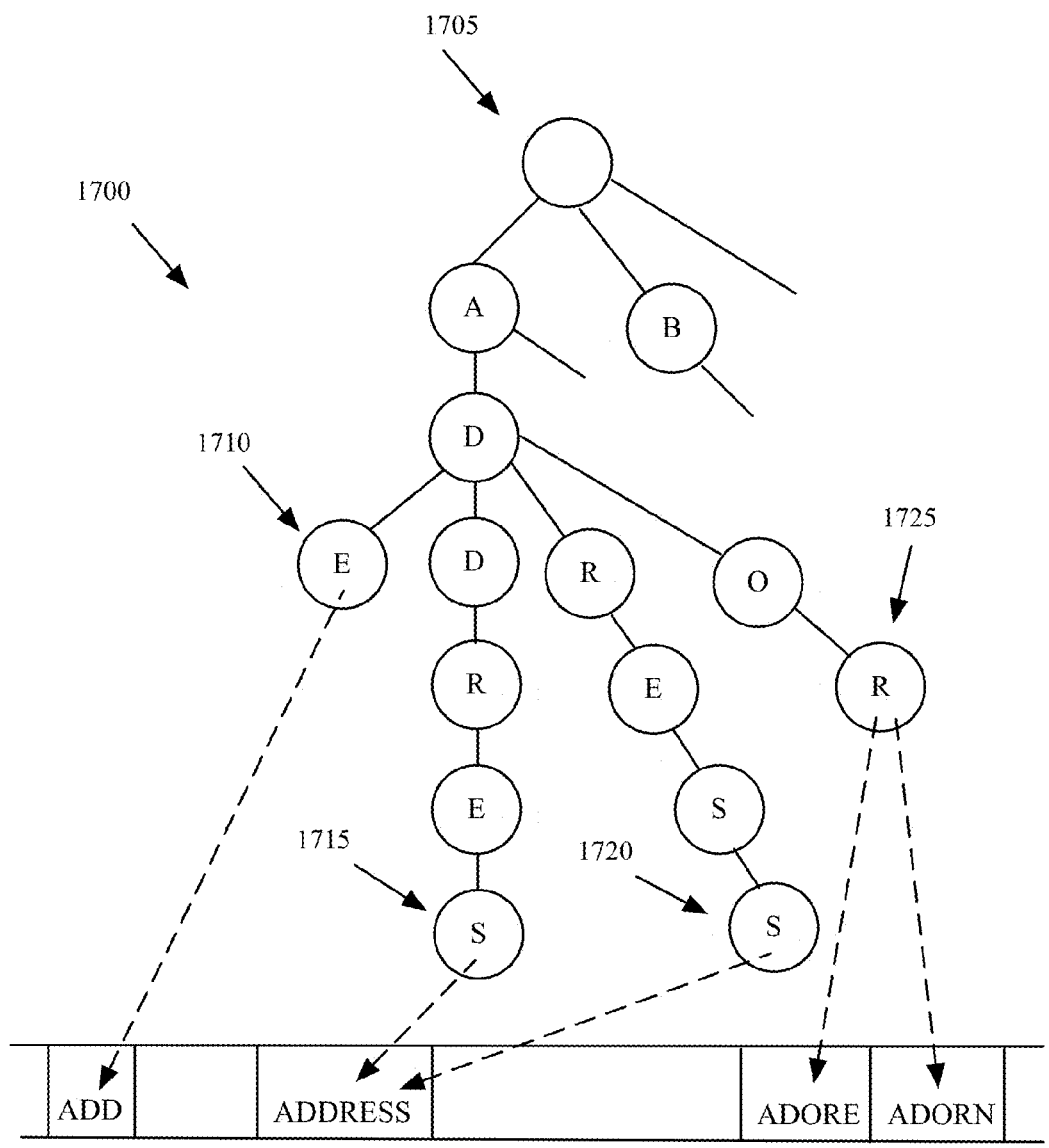
FIG. 17 conceptually illustrates a portion of a common misspellings prefix tree in some embodiments of the invention.

Different embodiments described in this specification utilize different data structures for the common misspellings. Some embodiments utilize a prefix tree. Other embodiments utilize a look-up map. FIG. 17 conceptually illustrates a portion 1700 of a common misspellings prefix tree in some embodiments of the invention. As shown, the root node 1705 is associated with an empty string. In this example, strings for four common misspellings "ade," "addres," "adress," and "ador" are shown. The leaf nodes 1710-1725 point to correct spelling for each string. As shown, the correct spelling for both strings "addres" and "adress" is "address." On the other hand, there are two suggestions, "adore" and "adorn," for the misspelled string "ador." As described further below, the common misspelling prefix tree is utilized to quickly identify whether a typed word is a common misspelling and to provide one or more suggestions for the misspelled word.

Figure 18:
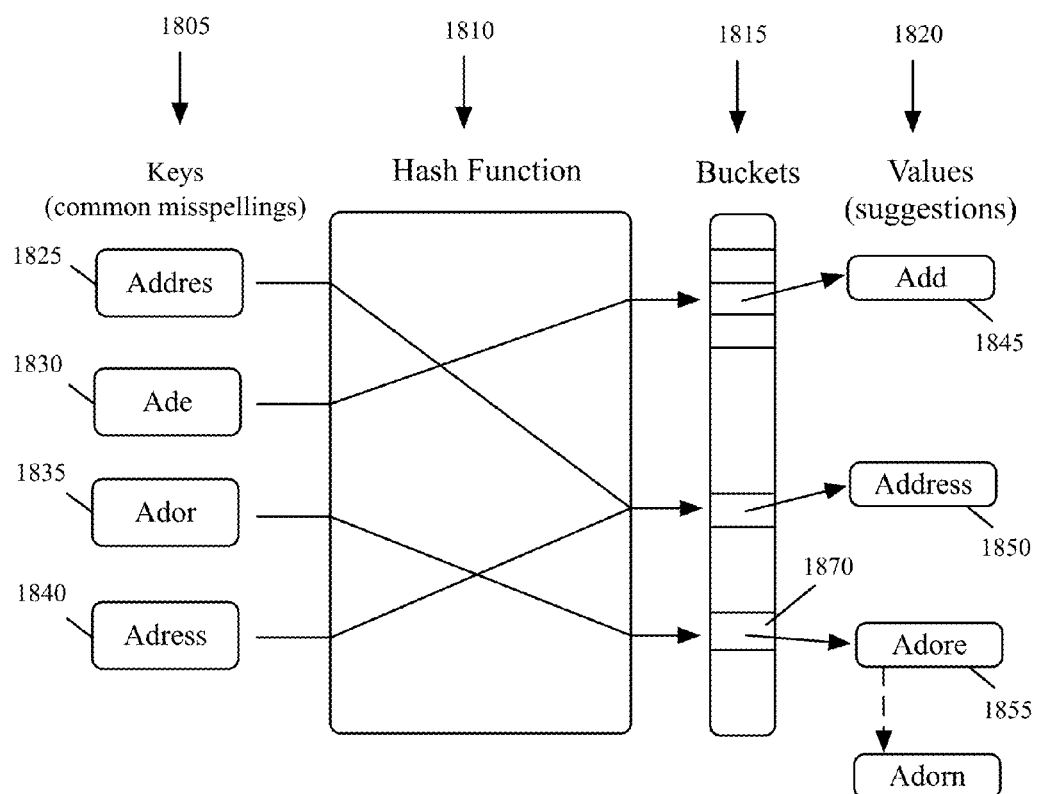
FIG. 18 conceptually illustrates how a hash table is used as a look-up map for common misspellings in some embodiments of the invention.

FIG. 18 conceptually illustrates how a hash table is used as a look-up map for common misspellings in some embodiments of the invention. As shown, the keys 1805 for the hash table are common misspellings. In this example, strings 1825-1840 for four common misspellings "ade," "addres," "adress," and "ador" are shown, respectively. The hash function 1810 maps each key to a bucket or slot. The buckets 1815 point to strings 1820 for suggestions. As shown, the common misspellings addres 1825 and adress 1840 are both mapped to the suggestion 1850. The common misspelling ade 1830 is mapped to suggestion 1845. The common misspelling ador 1835 is mapped to a bucket 1870, which point to two suggestions 1855 and 1860. Using a common misspelling as a key, therefore, results in one or more suggestions. Searching for a string that is not a common misspelling results in the look-up map to return an exception (such as a null value) to indicate that the string is not found in the look-up map.

Figure 19:
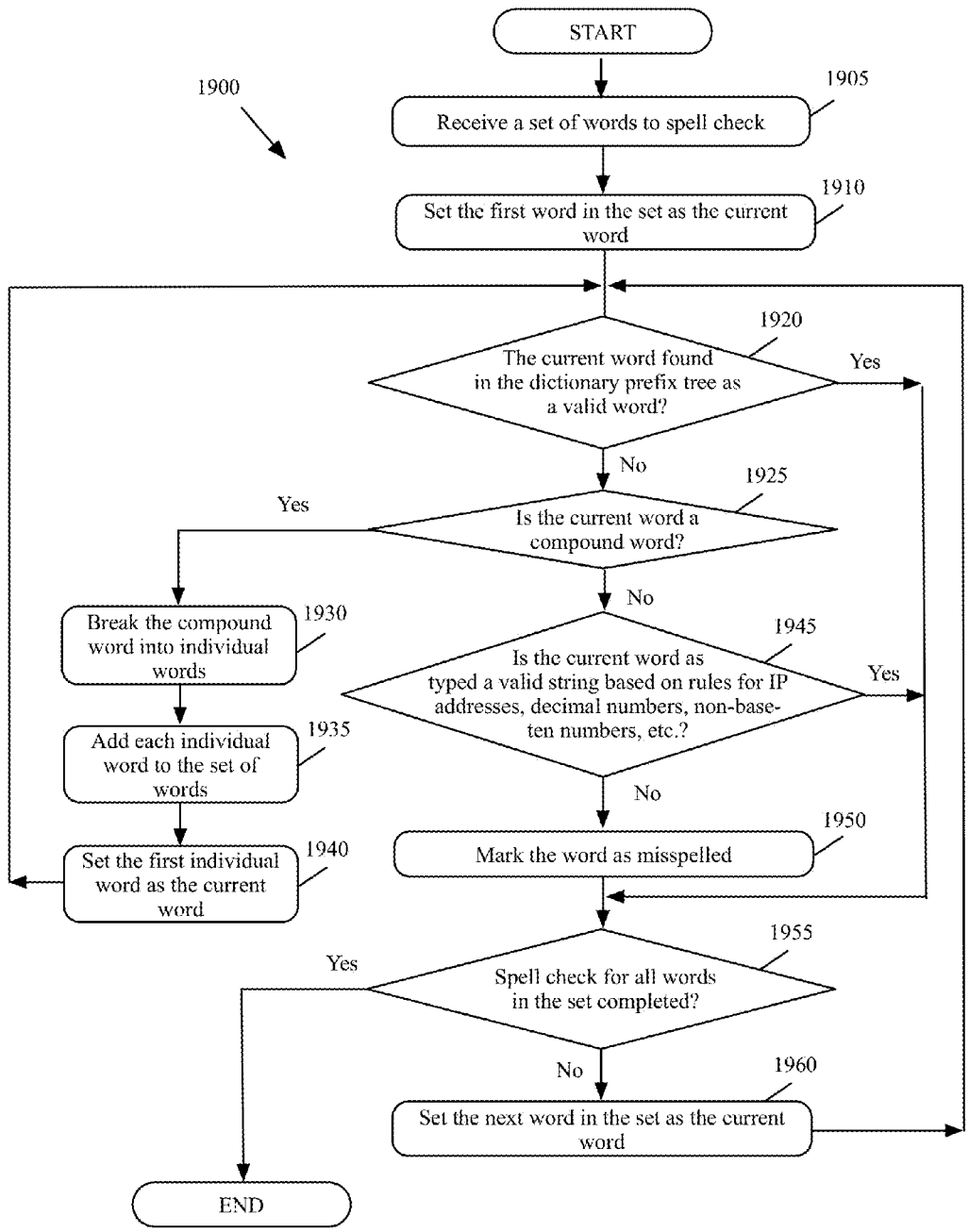
FIG. 19 conceptually illustrates a process for determining whether a set of typed words includes misspelled words in some embodiments of the invention.

FIG. 19 conceptually illustrates a process 1900 for determining whether a set of typed words includes misspelled words in some embodiments of the invention. Process 1900 is utilized, e.g., to determine whether a file that includes text has misspelling. The process is also used as individual words are typed to determine whether the word is misspelled (in this case the number of words in the set is one).

As shown, the process receives (at 1905) a set of words to spell check. The process then identifies and sets (at 1910) the first word in the set as the current word. For instance, the process scans (or parses) the characters in a text string and identifies terminators such as punctuation marks that delimit words in sentences and phrases.

The process then determines (at 1920) whether the current word matches a string in the prefix dictionary that is identified as a valid word. For instance, assume that the typed string is "bag" and the dictionary prefix tree is prefix tree 600 shown in FIG. 6. A search of the tree results a match between the typed word and the string terminated at node 620. Since node 620 is marked as the last node for a valid string (as conceptually shown with a black dot), process 1900 determines that the string "bag" is a correctly spelled word. On the other hand, assume that the typed string is "bagg." Although this string matches the string terminated at node 640, the string is not identified as a valid word by the prefix tree since the node 640 is not identified as the last node for a valid string. When the process determines that the current word is a valid word, the process proceeds to 1955, which is described below.

Figure 20:
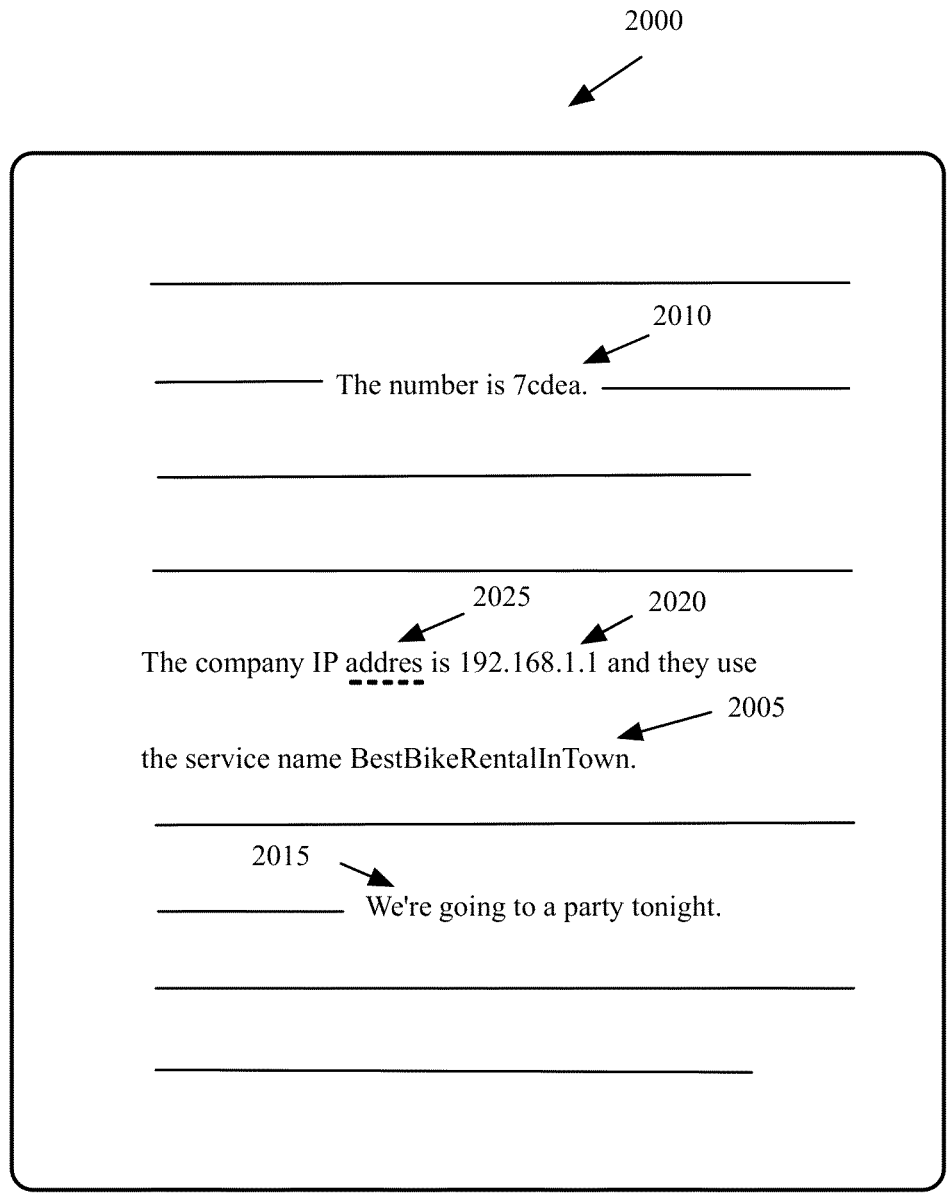
FIG. 20 illustrates a user interface in some embodiments of the invention.

Otherwise, the process determines (at 1920) whether the string is a compound word. FIG. 20 illustrates a user interface 2000 in some embodiments of the invention. The user interface shows a page of a document and includes several examples of the strings that are not in the dictionary but are considered valid words and are not marked as misspelled words in some embodiments of the invention. The page also includes a misspelled string "addres" 2025, which is underlined to visually indicate that the string is misspelled.

As shown, the string "BestBikeRentalInTown" 2005 is not underlined as a misspelled word. The string includes multiple uppercase (or capital letters) that separate several valid words. This type of string is referred to as a camel case where the string includes inner uppercase letters. In this example, valid strings "Best," "Bike," "Rental," "In," and "Town" are joined without spaces. Many product names are written as camel case. In addition, some embodiments consider a hyphenated compound of valid word to be a valid compound word. Process 1900, therefore, identifies compound words (such as camel case strings) and does not mark them as invalid word. When the string is not a compound word, the process proceeds to 1945, which is described below.

Otherwise, the process breaks (at 1930) the compound word into individual words. The process then adds (at 1935) the individual words to the set of words for further spell checking. The process then sets the first individual word in the compound word as the current word. The process then proceeds to 1920, which was described above.

The process determines (at 1945) whether the current word as typed is a valid word based on a set of rules that identify words that are not in the dictionary but are intended to be valid as typed. For instance, IP addresses are widely used in modern technical text and are not generally found in the dictionary but are nevertheless valid strings since the user intends to type them in predetermined formats (e.g., 192.168.1.1). In the example of FIG. 20, the IP address 2020 is not underlined as the string is recognized as a valid string. Similarly, Internet domain names are widely used and are not generally found in the dictionary but are considered valid strings since the user intends to type them in one or more predetermined formats (e.g., www.xyz.com or https://xyz.com, etc.). Some embodiments include a set of rule to identify different strings that are not in the dictionary but, based on their format or the sequence of characters, are considered valid as typed.

For instance, the set of rules in some embodiments identify abbreviations, prefixes, postfixes, such as "ing," "ed," "'s," etc., as valid and remove them prior to spell checking a word. For instance, the string "We're" 2015 is not marked as misspelled in FIG. 20. Some embodiments consider a valid word followed by an apostrophe followed by a suffix such as "s," "ed," "er," "ll," "ye," "ing," etc., to also be a valid word.

The set of rules, in some embodiments, also exclude words with decimal points, hexadecimal and octal numbers, etc. For instance, in FIG. 20, string "7cdea" is recognized as a valid hexadecimal number and is not marked as misspelled. In addition, some embodiments consider a word consisting entirely of hexadecimal digits with or without being preceded by "Ox" as a valid word. Some embodiments consider a word consisting entirely of decimal digits as a valid word. Some embodiments also recognize a word that includes at most 6 uppercase letters plus optionally some decimal point (or plus optionally some decimal digits in even positions and periods in odd positions) as a valid word.

When process 1900 determines that a string is valid as typed based on the spell checking rules, the process proceeds to 1955, which is described below. Otherwise, the process marks (at 1950) the string as misspelled. A misspelled word is visually identified (e.g., as underlined) in some embodiments. As shown in FIG. 20, the string "addres" 2025 is underlined to be visually identified as a misspelled word.

The process then determines (at 1955) whether spell checking for all words in the set is completed. If so, the process ends. Otherwise, the process sets (at 1960) the next word in the set as the current word. The process then proceeds to 1920, which was described above.

II. Providing Corrections Suggestions for Misspelled Words

After a word is identified as a misspelled word, some embodiments provide a list of suggestions to correct the misspelling. In some embodiments, as soon as a word is identified as a misspelled word, a list of suggestions is prepared and stored. Once the user requests for suggestions, the list is displayed. In other embodiments, the list is prepared and displayed after the user requests for suggestions.

Some embodiments provide up to a predetermined number of suggestions for each misspelled word. For instance, when the predetermined number is set to three and the number of suggestions is three or less, all suggestions are displayed. On the other hand, when the number of suggestions is more than three, then the suggestions are scored and only the top three scored suggestions are displayed. Different criteria for scoring the suggestions are described further below.

Figure 21A:
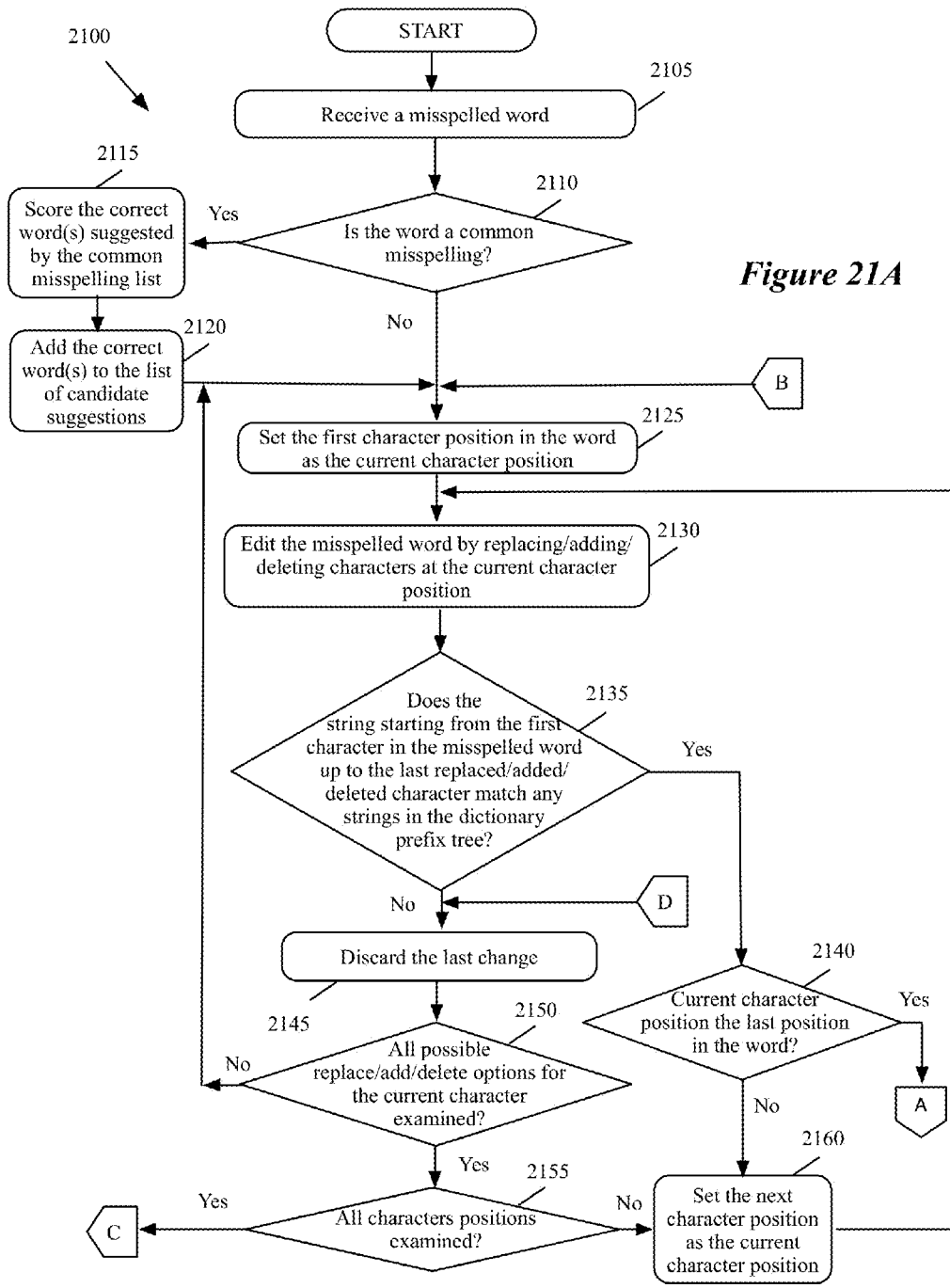
FIGS. 21A and 21B conceptually illustrate a process for identifying correction suggestions for misspelled words in some embodiments of the invention.
Figure 21B:
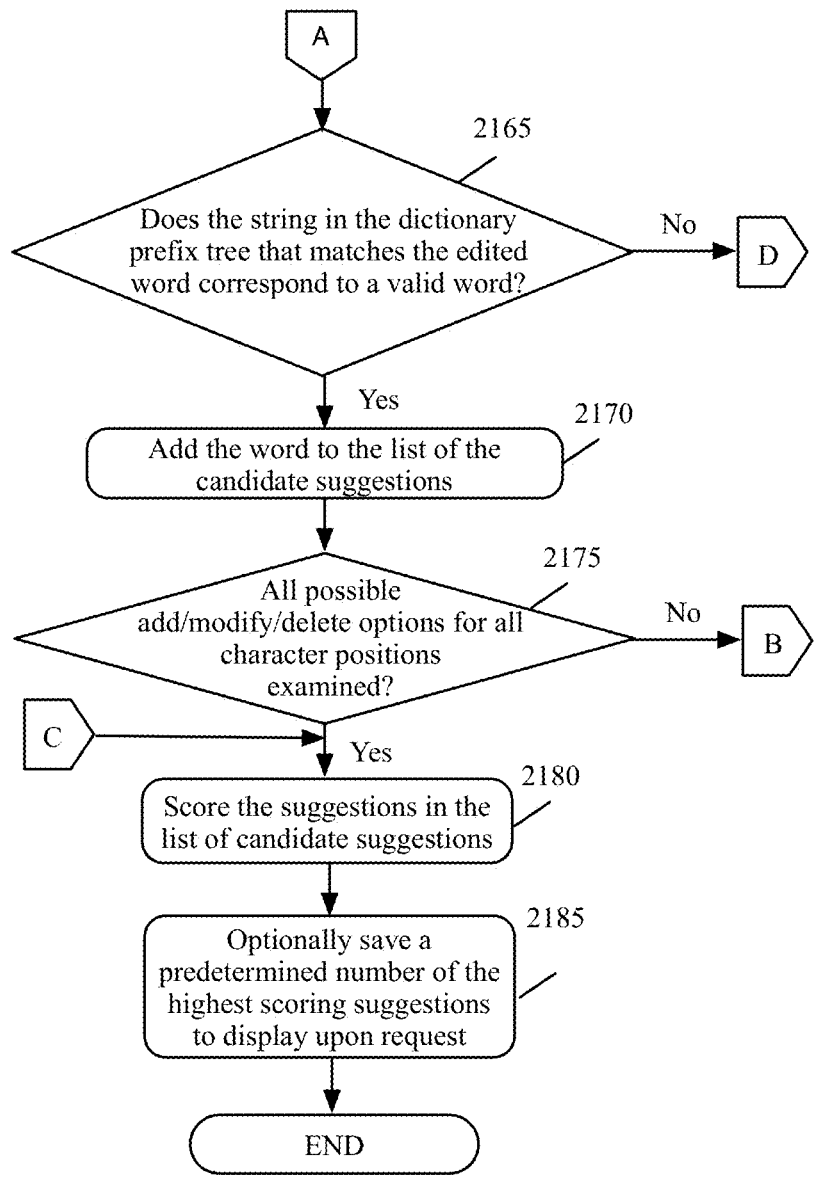

FIGS. 21A and 21B conceptually illustrates a process 2100 for identifying correction suggestions for misspelled words in some embodiments of the invention. As shown, the process receives (at 2105) a misspelled word. In some embodiments when process 1900 identifies a misspelled word, process 2100 receives the word in order to determine a set of suggestions and store them to display to the user upon request. In other embodiments, the suggestions are determined only after the user requests for suggestions. In these embodiments, process 2100 receives the misspelled word after the user requests for suggestions.

Next, process 2100 determines (at 2110) whether the word is a common misspelling (e.g., by using the look-up map or searching the common misspelling prefix tree). For instance, if the word is "addres" and the common misspelling prefix tree is as shown in FIG. 17 the word matches the string terminated to node 1715 and the corrections suggestion is "address" (as pointed to by node 1715). On the other hand, if the word is "ador," there are two suggestions: "adore" and "adorn," as pointed by node 1725. A similar result is achieved for the embodiments that utilize a look-up map (e.g., as shown in FIG. 18) for the common misspellings.

When the string does not match any common misspelling, the process proceeds to 2125, which is described below. Otherwise, when the string matches one or more common misspelling strings that point to correction suggestions, the suggestions are scored (at 2115) and are added (at 2120) to a list of possible suggestions. Some embodiments give suggestions provided by the common misspelling list the highest score and always provide them to the user. Other embodiments give high scores to the suggestions provided by the common misspelling list but compare the scores with the scores for other suggestions found by editing the misspelled word as described below.

In order to find more suggestions, the process edits the misspelled word by adding characters to the word or by replacing or deleting the characters in the word. A naive, and commonly used, approach would be to alter the input string first, generating a large amount of candidates and then to verify each of those candidates against a dictionary. In contrast, some embodiments utilize a simple traversal of the prefix tree to only extract correct words similar to the string in question. This process often generates the same suggestion more than once. The number of times each of the suggestions was generated serves as a score that ultimately determines which suggestions to display to the user. By building up words incrementally, amount of vocabulary to search through is limited. An important benefit of using this approach is keeping string manipulation to a minimum, which is key to good performance in browser-based application written in e.g., JavaScript. These enhancements allow a user to get fast feedback and correction suggestions.

Some embodiments allow a predetermined number of edits for each character positions. For instance, when the misspelled word is "peopel," the first character can be changed from "p" to any other characters. For instance, one possible edit is changing the first "p" to "t" results in "teopel." This is referred to as 1 edit-distance. A second possible edit for the first character position is to add another character either to the left or to the right of the first character. This is referred to as 2 edit-distance. Some possible 2 edit-distance edits for the first character are "ateopel," "taeopel," "bteopel," "tbeopel," etc.

After each add, replace, or delete, the edited word is checked against the strings in the dictionary prefix tree to find a match and only changes for which a match is found are further pursued. A match is found when the edited portion of the misspelled word (i.e., the string in the edited misspelled word starting from the first character to the last added/replaced/deleted character) matches a string in the prefix tree starting from a first node after the root of the tree all the way to either a middle node or a leaf node that terminates a valid word. The last character edit is discarded if searching the prefix tree does not result in a match with a valid word. The edited word is further edited by adding, replacing, or deleting other characters in the edited word if the partial result matches any strings in the prefix tree. The process continues until the edited word (from the first character to the last character in word) matches a string associated to a valid word in the tree.

Figure 22:
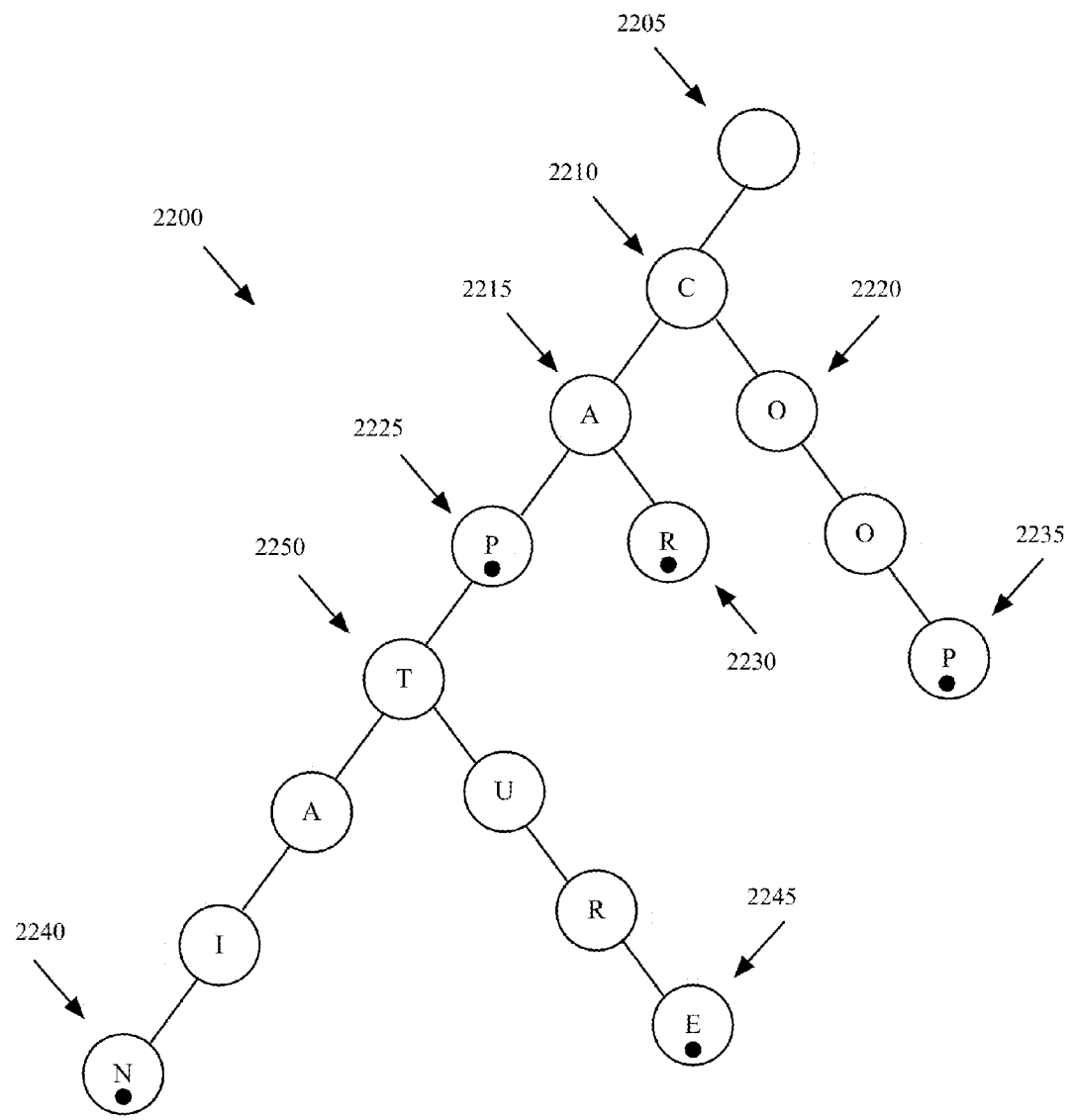
FIG. 22 conceptually illustrates a dictionary prefix tree in some embodiments.

The following example clarifies how suggestions are found in some embodiments of the invention. FIG. 22 conceptually illustrates a dictionary prefix tree in some embodiments of the invention. For simplicity, assume that the universe of valid words is limited to the strings shown in FIG. 22. The tree indicates that the valid words are "cap," "car," "coop," "captain," and "capture." The terminating nodes 2225-2245 are conceptually marked with a black dot in the figure to identify the strings that correspond to valid words. Some embodiments define a data structure for the prefix tree and flag the nodes that correspond to the last character in valid words.

When the misspelled word is "cbp," there is no point to change "c" to any other characters, since the resulting words do not match any strings in the prefix tree (as in this hypothetical example all valid words start with "c"). Also, there is no point to add any characters before "c" since in this example no valid word has "c" in second character position.

However, replacing "b" with "a" results in a match between "ca" (which is the string in the edited misspelled word starting from the first character to the last added/modified/deleted character) and the string starting from the first node 2210 after the root node 2205 of the tree and ending to the node 2215. Although this string is not associated with a valid word (as node 2215 is not marked with a black dot), the match creates the possibility for the misspelled word to further be edited to result in a valid word (e.g., "cap" or "car"). Similarly, replacing "b" to "o" results in a match between "co" and the string that starts on node 2210 and ends to node 2220.

Changes to the misspelled word "cbp" continues until a change results to a valid string such as "cap," "car," or "coop." Some of the valid strings can be reached multiple times. For instance, editing "cbp" results in "coop" if a character is added after "c" and "b" is changed to "o." Editing "cbp" also results in "coop" if "b" is changed to "o," "p" is changed to "o," and a "p" is after the last character. Some embodiments assign a score to a suggestion depending on how easy a misspelled word can be edited to reach the suggestion (i.e., how many character has to be added/modified/deleted) or how many times editing the misspelled word results on the same suggestion. The easier a misspelled word can be edited to reach a suggestion and the more ways that editing the misspelled word results to the same suggestion, the higher is the score for that suggestion.

Referring back to FIG. 21A, process 2100 sets (at 2125) the first character position in the misspelled word as the current character position. The process then edits (at 2130) the misspelled word by replacing/adding/deleting characters at the current character position (e.g., as described above by reference to FIG. 22). The process then determines (at 2135) whether the edited string, starting from the first character of the misspelled word to up to the last replaced/added/deleted character matches any strings in the dictionary prefix tree (e.g., as described above by reference to FIG. 22). If yes, the process proceeds to 2140, which is described below.

Otherwise, the process discards (at 2145) the last change since there is no chance that any further change results in a valid string. The process then determines (at 2150) whether all possible replace/add/delete options for the current character examined. If not, the process proceeds to 2125, which was described above. Otherwise, the process determines (at 2155) whether all character positions in the misspelled word edited. If not, the process sets (at 2160) the next character position in the misspelled word as the current character position. The process then proceeds to 2130, which was described above. Otherwise, when all character positions are examined, the process proceeds to 2180 to score the suggestions as described below.

When the edited string matches a string in the dictionary prefix tree, the process determines (at 2140) whether the current character position is the last position in the word. If no, the process proceeds to 2160 to replace/add/delete the next character as described above.

Otherwise, the process determines (at 2165) whether the string in the dictionary prefix tree that match the edited word corresponds to a valid word. In the example of FIG. 22, a final edited word of "cap" matches the string "cap" in the prefix tree. Since the string "cap" in the tree corresponds to a valid word (as conceptually illustrated by the black dot on node 2225), the final edited word is a valid word. On the other hand, the final word can be "capt" which is reached by editing the misspelled word "cbp" to replace "b" with "a," and adding "t" to the end of the last character. This string matches the string that starts with node 2210 and ends to node 2250. However, node 2250 does not terminate a valid string. The edited word "capt" is therefore not a valid word. Since process 2100 reaches the decision point 2165 after all edits are done to the word, the string "capt" cannot be used as a valid correction suggestion.

Accordingly, when the string in the dictionary prefix tree that match the edited word does not correspond to a valid word, the process proceeds to 2145 to discard the word as described above. Otherwise, the process adds (at 2170) the word to the list of the candidate suggestions. The process then determines (at 2175) whether all possible replace/add/delete options for all character positions of the misspelled word examined. If not, the process proceeds to 2125 to find another correction suggestion, as described above. When all possible changes to the misspelled word are examined, the process scores (at 2180) the suggestions in the list of candidate suggestions.

For instance, a suggestion that is found in the list of common misspellings gets the highest point in some embodiments. Some embodiments also score the candidate suggestions by the number of ways that a misspelled word is transformed into a candidate suggestion by doing different 2 edit-distance operations. The suggestions in some embodiments also receive higher scores when they are reached with fewer modifications to the misspelled word or when the same suggestion is reached through different modifications to the misspelled word. The process then optionally saves (at 2185) a predetermined number of suggestions with highest scores to display to the user upon request. The process then ends.

Figure 23:
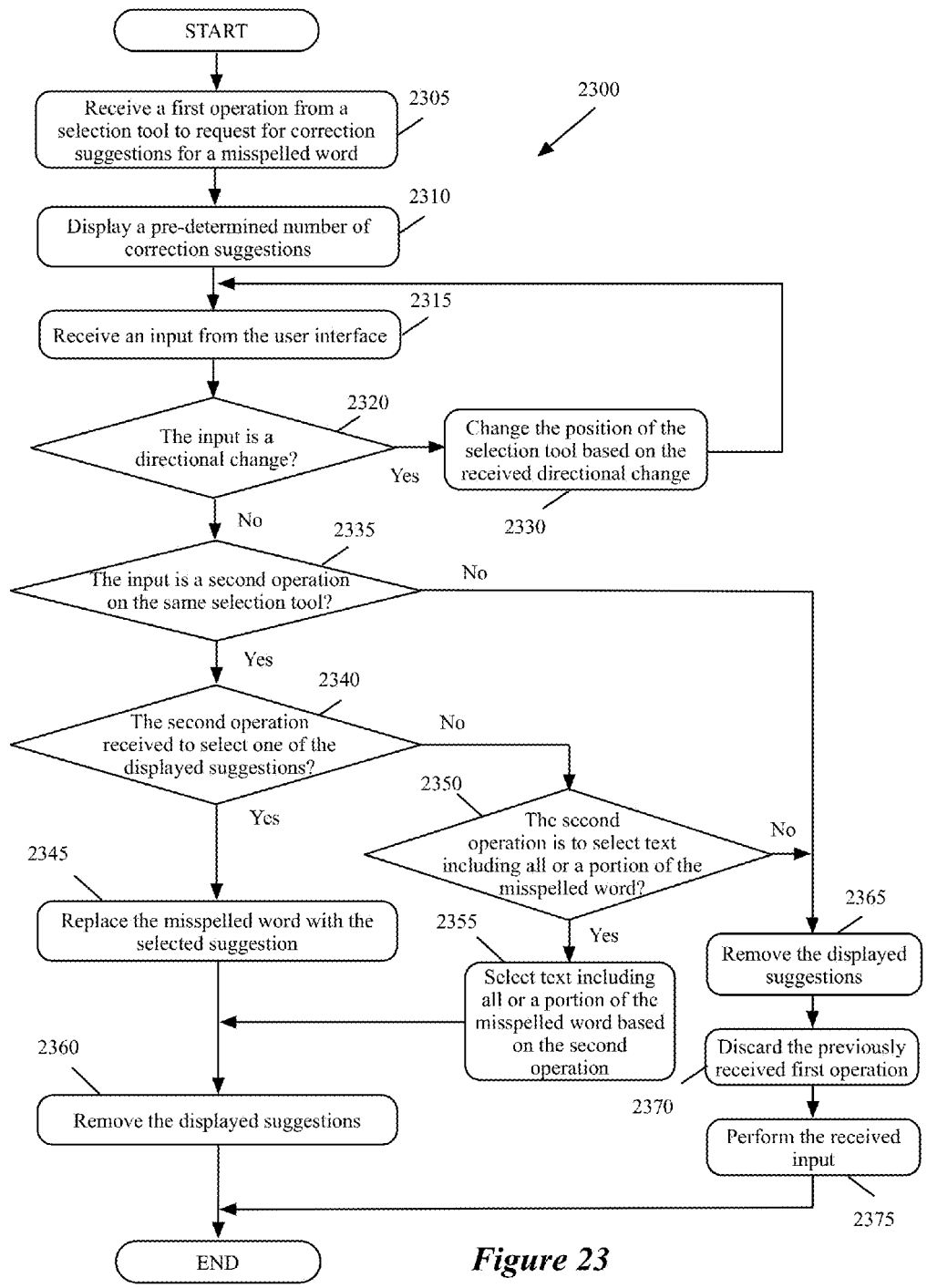
FIG. 23 conceptually illustrates a process for displaying and applying spelling suggestions in some embodiments of the invention.

III. User Interface for Providing Spelling Suggestions and Receiving User Selections Some embodiments provide a novel graphical user interface metaphor for providing suggestions and receiving a user selection of one of the suggestions. FIG. 23 conceptually illustrates a process 2300 for displaying and applying spelling suggestions in some embodiments of the invention. Process 2300 is described by reference to FIGS. 24 and 25. As shown in FIG. 23, process 2300 receives (at 2305) a request for providing correction suggestions for a misspelled word. In some embodiments, the process receives a request for suggestion when a user places a selection tool over a misspelled word and applies a first selection operation (or an activation operation). An example of such selection operation in some embodiments is when a locating tool (e.g., the cursor) is placed over a misspelled word and a selection tool such as the primary selection button of the mouse is pressed and held (i.e., activated) without releasing the button.

The process then displays (at 2310) a pre-determined number of correction suggestions for the misspelled word. In some embodiments, process 2300 retrieves the suggestions that were identified and stored by process 2100 and displays the suggestions. In other embodiments, process 2300 activates process 2100 after the request for correction suggestion is received in order to identify the suggestions.

Figure 24:
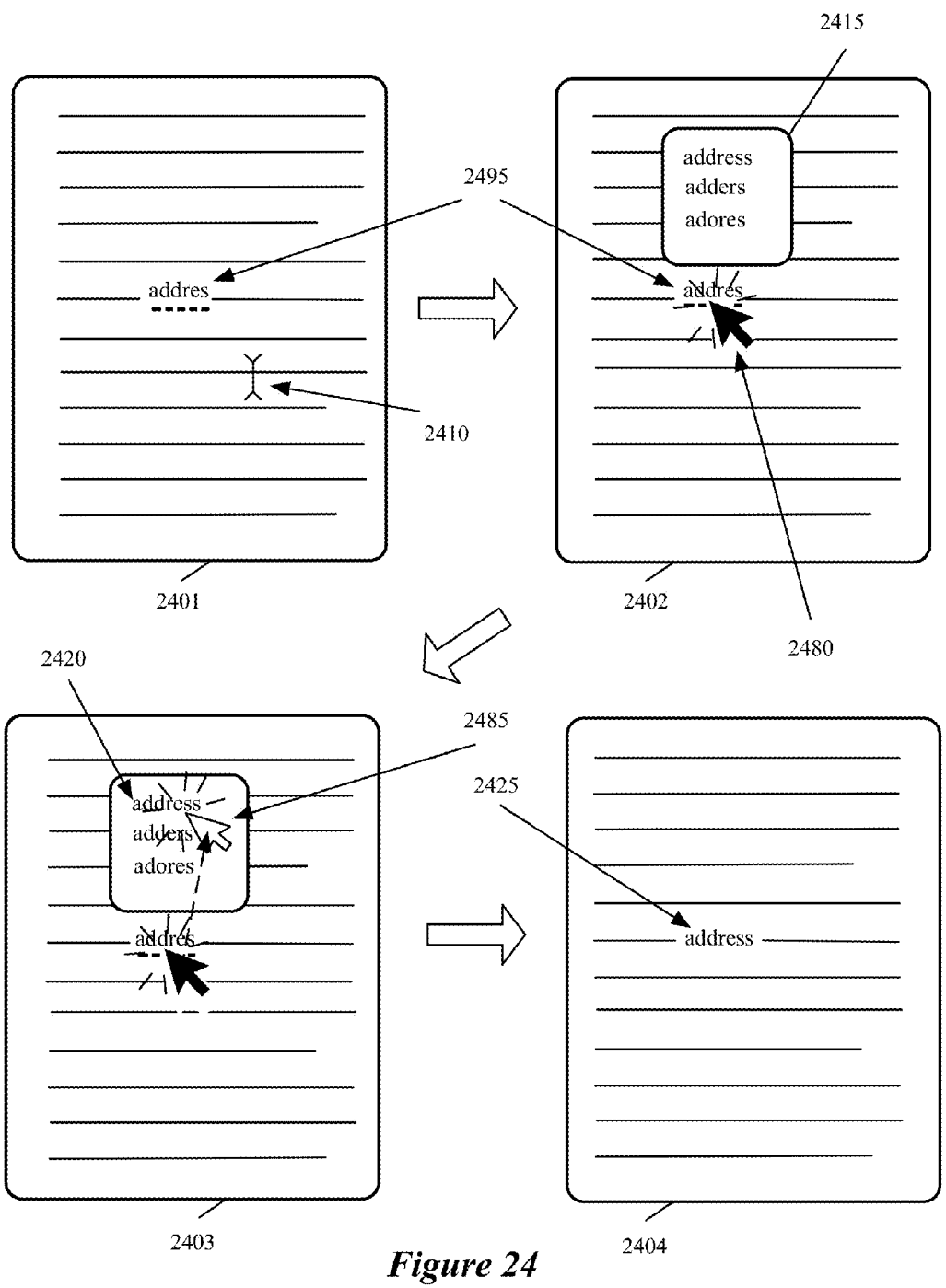
FIG. 24 illustrates a portion of a graphical user interface in some embodiments of the inventions.

FIG. 24 conceptually illustrates a portion of a graphical user interface in some embodiments of the inventions. The graphical user interface is shown in four stages 2401-2404. In stage 2401, the graphical user interface shows a portion of a document that includes the misspelled string "addres" 2495. String 2495 is visually identified (in this exampled underlined) as a misspelled word. As shown, in this stage the location tool (e.g., the cursor) is away from the misspelled string, as conceptually shown by the vertical symbol caret 2410.

As shown in stage 2402, the user places the locating tool over (or in close vicinity of) the misspelled word 2495, and utilizes a selection tool such as the primary button of a mouse to make a first selection operation. In some embodiments, the selection tool is a primary selection tool such as the primary (usually the left) button of a mouse or an equivalent tool on a touchpad or tracking ball. For instance, the first selection operation is pressing down on the primary mouse button and holding the button. This is conceptually shown by the black arrow 2480 to indicate that the primary selection tool on a selection device such as mouse, touchpad, etc., is activated but not released. As shown in stage 2402, a list 2415 of one or more suggestions for the misspelled word is displayed after the first selection operation is received. As shown, the list 2415 includes three suggestions "address," "adders," and "adores."

One advantage of using the primary selection button over the secondary button is that the embodiments described in this specification function the same regardless of whether the selection tool has only one button or more than one button. In contrast, if displaying the suggestion list requires the use of the secondary selection button (e.g. if it requires a right click in a two button mouse), then the user either will not be able to use a selection tool with only one button or the user has to use menus or other techniques to do spell correction. Also, as shown, the user interface is different than the traditional desktop applications in which a single left click over the misspelled word moves the locating tool's caret 2410 to where the user has clicked while a single right click pops up the context-sensitive menu that contains correction suggestions.

Referring back to FIG. 23, process 2300 then receives (at 2315) an input from the user interface. The process then determines (at 2320) whether the input is a directional change to a location tool such as the cursor. If so, the process changes (at 2330) the position of the selection tool (i.e., selection tool 2480 in FIG. 24) and proceeds back to 2315 to receive another input. When the input is not a directional change, the process determines (at 2335) whether the input is a second operation received from the same selection tool. For instance, when the first operation was received from the primary button of a mouse, the process determines whether the input is received from the same primary button. If not, the process proceeds to 2365, which is described below.

Otherwise, the process determines (at 2340) whether the second operation was received to select one of the displayed suggestions. For instance, the process determines whether the primary selection tool was released over one of the displayed suggestions. If not, the process proceeds to 2350, which is described below. Otherwise, the process replaces (at 2345) the misspelled word with the selected suggestion. The process then removes (at 2360) the displayed suggestions. The process then ends.

As shown in stage 2403 in FIG. 24, the user has moved the selection tool (e.g., by a dragging operation on a mouse or on a touchpad) over one of the suggestions (over the string "address" 2420). The user then makes the selection through the pointing device (e.g., by releasing the primary selection button on the mouse as is conceptually shown by the white arrow 2485). In stage 2404, the misspelled word "addres" 2495 is replaced by the selected suggestion "address" 2425.

When process 2300 determines that the second operation was not to select one of the suggestions, the process determines (at 2350) whether the second operations is to select text that includes all or a portion of the misspelled word (e.g., a portion of the misspelled word, a paragraph or a sentence that includes the misspelled word, etc.). If not, the process proceeds to 2365, which is described below. Otherwise, the process selects (at 2355) text that includes all or a portion of the misspelled word based on the second operation (e.g., as described by reference to FIG. 25, below). In some embodiments, such a selection includes selecting all characters starting from the character over which the first operation (at 2310) was received up to and including the character over which the second operation (at 2335) was received. The process then proceeds to 2360, which was described above.

The process removes (at 2365) the displayed suggestions. The process also discards (at 2370) the previously received first operation. The process then performs (at 2375) the received input. The process then ends.

Figure 25:
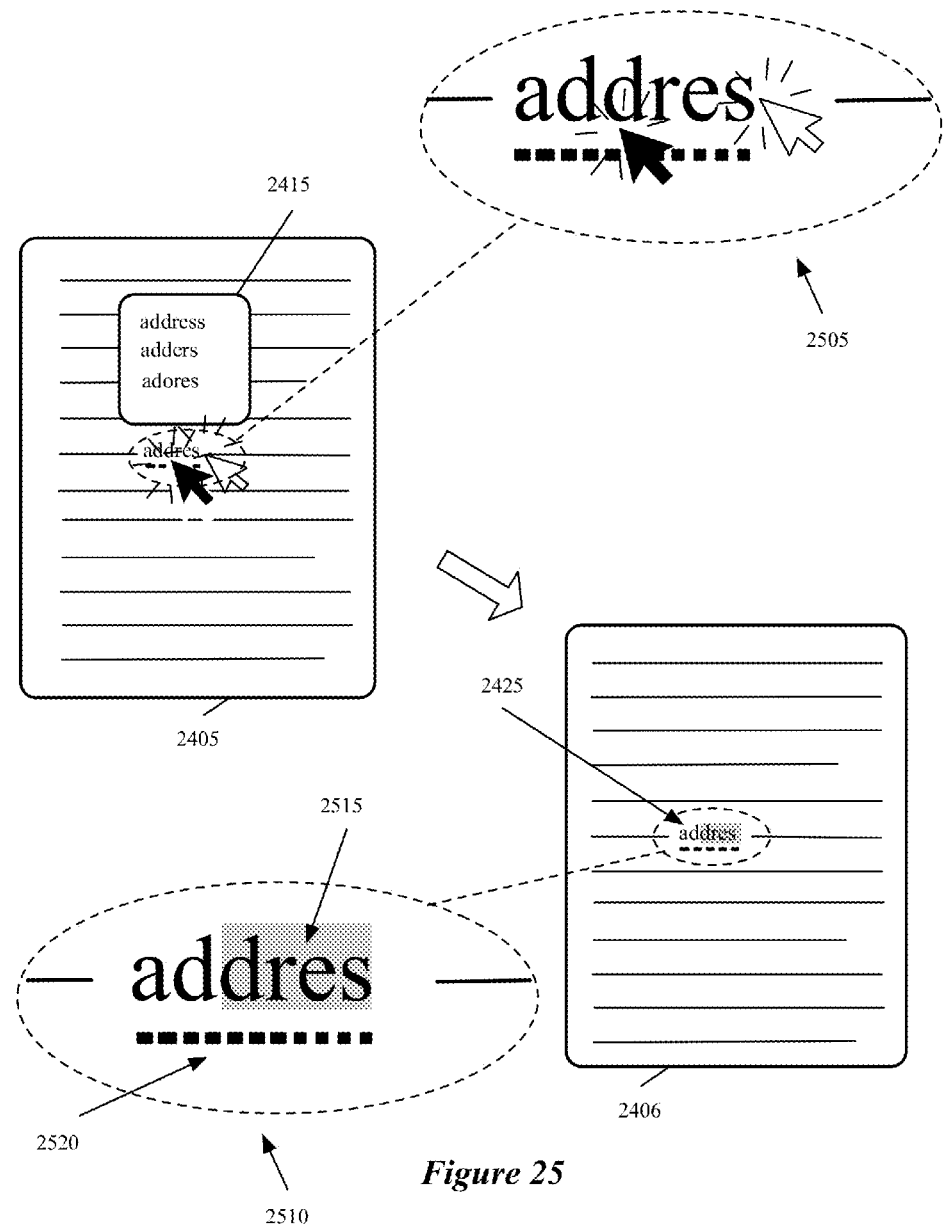
FIG. 25 conceptually illustrates a portion of a graphical user interface in some embodiments of the inventions.

FIG. 25 conceptually illustrates a portion of a graphical user interface in some embodiments of the inventions. The graphical user interface is described in four stages. The first two stages are the same as stages 2401 and 2402, shown in FIG. 24, and are not shown for clarity. In stage 2405 of FIG. 25, instead of selecting one of the displayed suggestions 2415, the user has started with pressing the primary selection button over the second "d" character and has moved the selection tool across the misspelled word and has released the primary selection button over the character "s" (as shown in the enlarged portion 2505). In stage 2406, as shown in the enlarged portion 2510, a portion of the string is selected and visually identified by highlight 2515. Also, the suggestions 2415 are removed from the display.

Since the same primary button is used to either select one of the suggestions or perform other operations, a suggestion is only selected when the primary button is released over one of the displayed suggestions. Alternatively, in the embodiment displayed in FIGS. 24 and 25, the user can press and release the primary button twice over the misspelled word in quick succession (commonly referred to as double click) to select the whole misspelled word instead of getting the suggestions 2415 displayed. Yet, the user can press and release the primary button over the misspelled word three times in quick succession to select the whole paragraph that includes the misspelled word.

Alternative Embodiments

The embodiments described in FIG. 23-25 use a single action of the primary selection tool (e.g., press down and hold of the primary mouse button) over a misspelled word to display the list of suggestions and another single action on the same primary button (e.g., release of the primary mouse button) to select one of the displayed options.

Figure 26:
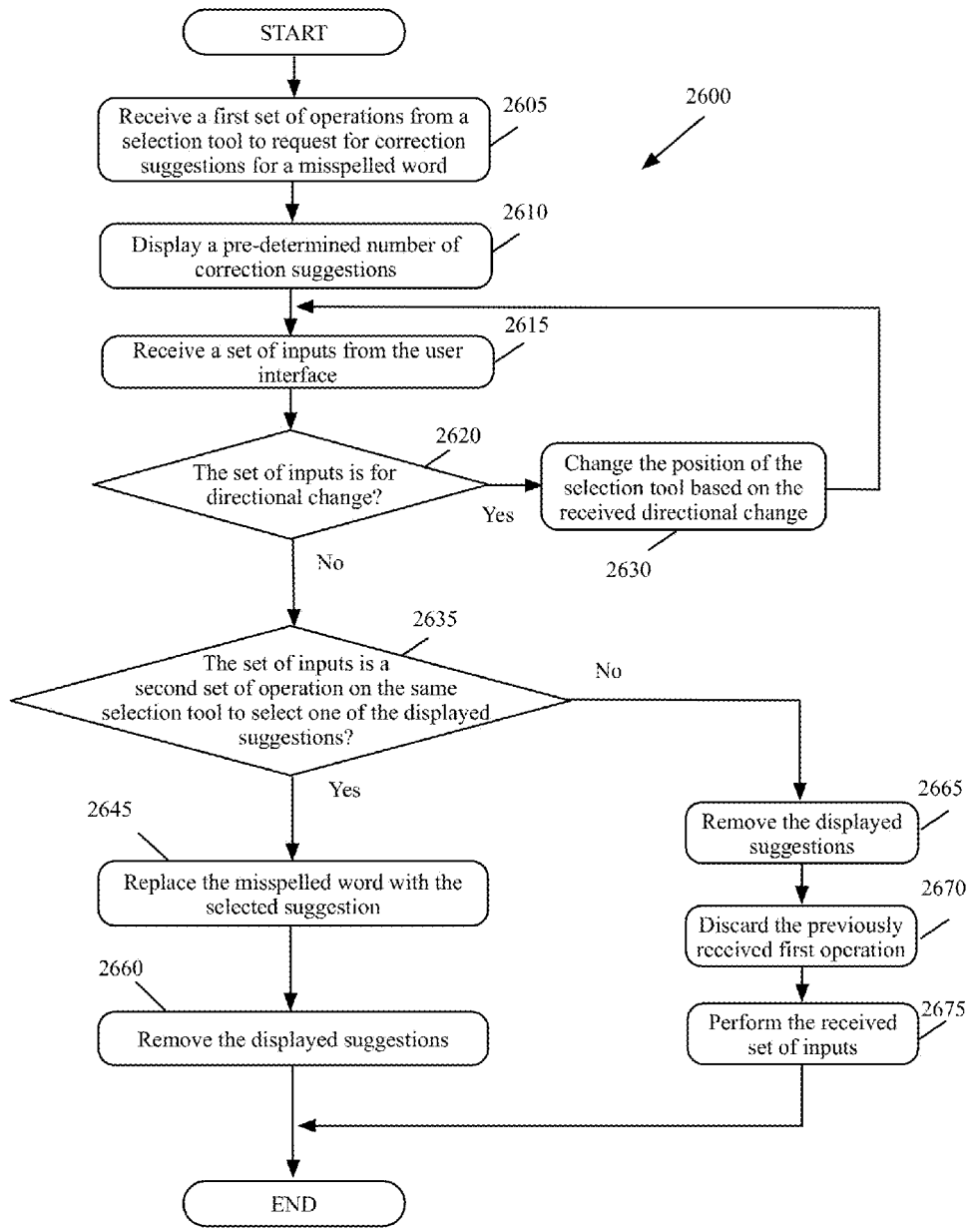
FIG. 26 conceptually illustrates an alternative process for displaying and applying spelling suggestions in some embodiments of the invention.

In some alternative embodiments, pressing and releasing the primary button over the misspelled word displays the list of suggestions instead of selecting the word. FIG. 26 conceptually illustrates an alternative process 2600 for displaying and applying spelling suggestions in some embodiments of the invention. Process 2600 is described by reference to FIGS. 27-28. As shown in FIG. 26, process 2600 receives (at 2605) a first set of operations from a selection tool to request for correction suggestions for a misspelled word. In some embodiments, the process receives a request for suggestion when a user places a selection tool over a misspelled word and applies a first set of selection operations. An example of such set of selection operations in some embodiments is when a locating tool (e.g., the cursor) is placed over a misspelled word and a selection tool such as the primary selection button of the mouse is pressed and released.

The process then displays (at 2610) a pre-determined number of correction suggestions for the misspelled word. In some embodiments, process 2600 retrieves the suggestions that were identified and stored by process 2100 and displays the suggestions. In other embodiments, process 2600 activates process 2100 after the request for correction suggestion is received in order to identify the suggestions.

Figure 27:
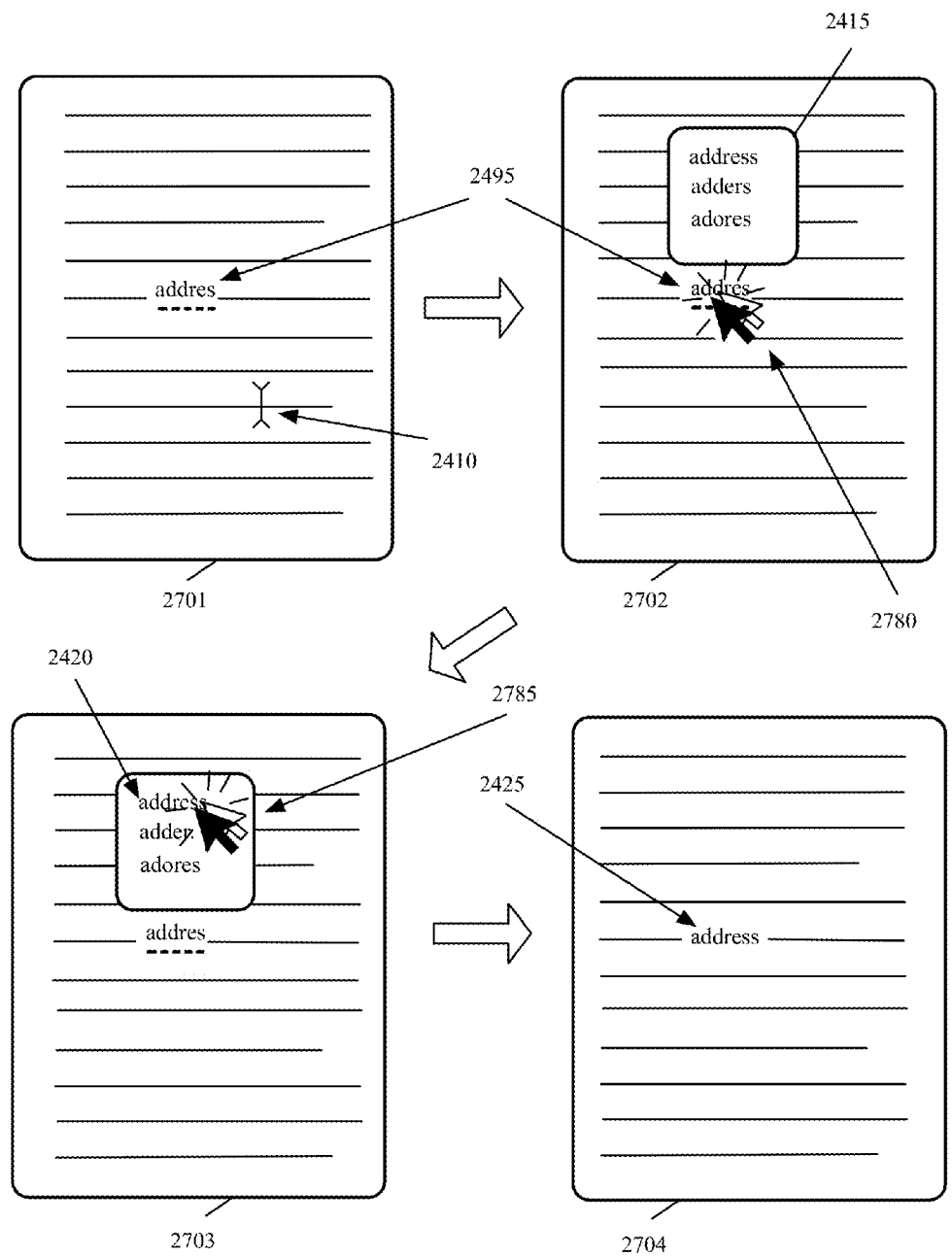
FIG. 27 conceptually illustrates a portion of a graphical user interface in some embodiments of the inventions.

FIG. 27 conceptually illustrates a portion of a graphical user interface in some embodiments of the inventions. The graphical user interface is shown in four stages 2701-2704. In stage 2701, the graphical user interface shows a portion of a document that includes the misspelled string "addres" 2495. String 2495 is visually identified (in this exampled underlined) as a misspelled word. As shown, in this stage the location tool (e.g., the cursor) is away from the misspelled string, as conceptually shown by the vertical symbol 2410.

As shown in stage 2702, the user places the locating tool over (or in close vicinity of) the misspelled word 2495, and utilizes a selection tool such as the primary button of a mouse to make a first set of selection operations. In some embodiments, the selection tool is a primary selection tool such as the primary (usually the left) button of a mouse or an equivalent tool on a touchpad or tracking ball. For instance, the first set of selection operations is pressing down on the primary mouse button and releasing the button. This is conceptually shown by the pair of black and white arrows 2780 to indicate that the primary selection tool on a selection device such as mouse, touchpad, etc., is activated and released. As shown in stage 2702, a list 2415 of one or more suggestions for the misspelled word is displayed after the first selection operation is received. As shown, the list 2415 includes three suggestions "address," "adders," and "adores."

Referring back to FIG. 26, process 2600 then receives (at 2615) a set of inputs from the user interface. The process then determines (at 2620) whether the set of inputs is for directional change to a location tool such as the cursor. If so, the process changes (at 2630) the position of the location tool (i.e., location tool 2410 in FIG. 27) and proceeds back to 2615 to receive another input. When the input is not a directional change, the process determines (at 2635) whether the set of inputs is a second set of operations received from the same selection tool to select one of the displayed suggestions. For instance, when the first operation was received from the primary button of a mouse, the process determines whether the set of inputs is a press down followed by release received from the same primary button. If not, the process proceeds to 2665, which is described below.

Otherwise, the process replaces (at 2645) the misspelled word with the selected suggestion. The process then removes (at 2660) the displayed suggestions. The process then ends.

As shown in stage 2703 in FIG. 27, the user has moved the selection tool (e.g., by a dragging operation on a mouse or on a touchpad) over one of the suggestions (over the string "address" 2420). The user then makes the selection through the pointing device (e.g., by pressing down and releasing the primary selection button on the mouse as is conceptually shown by the pair of back and white arrows 2785). In stage 2704, the misspelled word "addres" 2495 is replaced by the selected suggestion "address" 2425.

When process 2600 determines that the second operation was not to select one of the suggestions, the process removes (at 2665) the displayed suggestions. The process also discards (at 2670) the previously received first operation. The process then performs (at 2675) the received set of inputs. The process then ends.

In yet other embodiments, the set of operations received (at 2605) is pressing and releasing the primary selection button twice over the misspelled word in quick succession (e.g., a double click on the mouse primary button) to display the suggestions. In these embodiments, the second set of input operations received (at 2635) is another press and release of the primary selection button to select one of the displayed suggestions.

Figure 28:
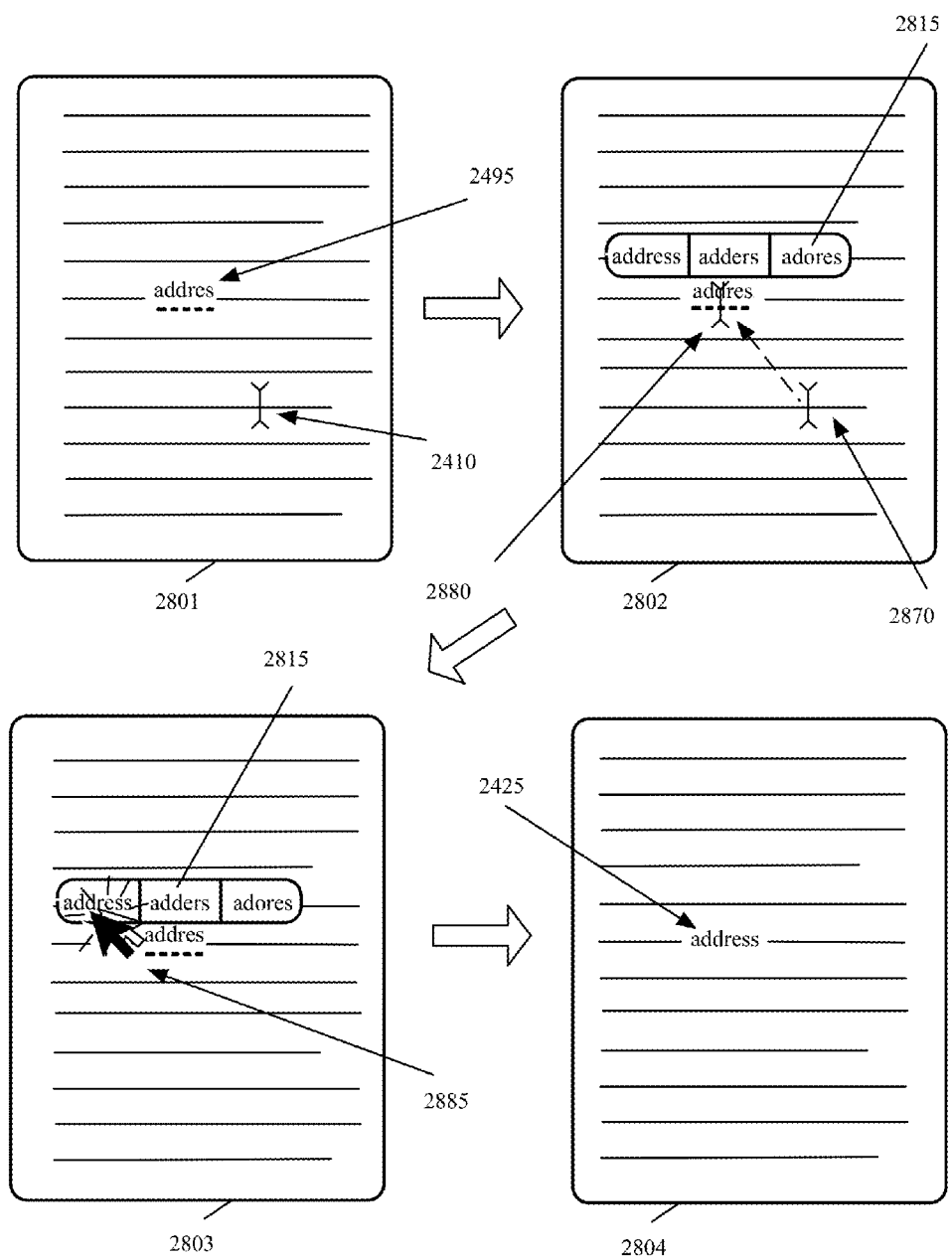
FIG. 28 conceptually illustrates a portion of a graphical user interface in some embodiments of the inventions.

In other alternative embodiments, the list of suggestions is displayed as soon as the location tool (e.g., the cursor) is placed over (commonly referred to as hovered over) the misspelled word. In these embodiments, process 2600 receives (at 2605) an indication that the location tool is placed over the misspelled word. Other operations of process 2600 are the same as described above. FIG. 28 conceptually illustrates a portion of a graphical user interface in some embodiments of the inventions. The graphical user interface is shown in four stages 2801-2804. In stage 2801, the graphical user interface shows a portion of a document that includes the misspelled string "addres" 2495. String 2495 is visually identified (in this exampled underlined) as a misspelled word. As shown, in this stage the location tool (e.g., the cursor) is away from the misspelled string, as conceptually shown by the vertical symbol 2410.

As shown in stage 2802, the user moves the locating tool from a location 2870 (which is away from the misspelled word 2495) and places the location tool at a location 2880 over the misspelled word 2495 (i.e. hovers the location tool over the misspelled word). As shown in stage 2802, a list 2815 of one or more suggestions for the misspelled word is displayed after the first selection operation is received. As shown, the list 2815 includes three suggestions "address," "adders," and "adores." The list 2815 is another style of displaying the suggestions. The list 2415, shown in FIGS. 24 and 27 displays the suggestions as a vertical list. The list 2815 displays the suggestions as a horizontal list either over the misspelled word (as shown) or under the misspelled word (not shown) depending on the available space. Either vertical or horizontal display of the suggestions can be used in any of the embodiments described in this Specification.

As shown in stage 2803 in FIG. 28, the user has selected the string "address" 2420 through the pointing device (e.g., by pressing down and releasing the primary selection button on the mouse as is conceptually shown by the pair of back and white arrows 2885). In stage 2804, the misspelled word "addres" 2495 is replaced by the selected suggestion "address" 2425.

IV. Software Architecture

In some embodiments, the spell checking processes described above are implemented as software running on a particular machine, such as a computer, a media player, a touchpad, a cell phone, or other handhold or resource limited devices (or stored in a machine readable medium). FIGS. 29-32 conceptually illustrate the software architecture of different components of a spell checking application of some embodiments.

Figure 29:
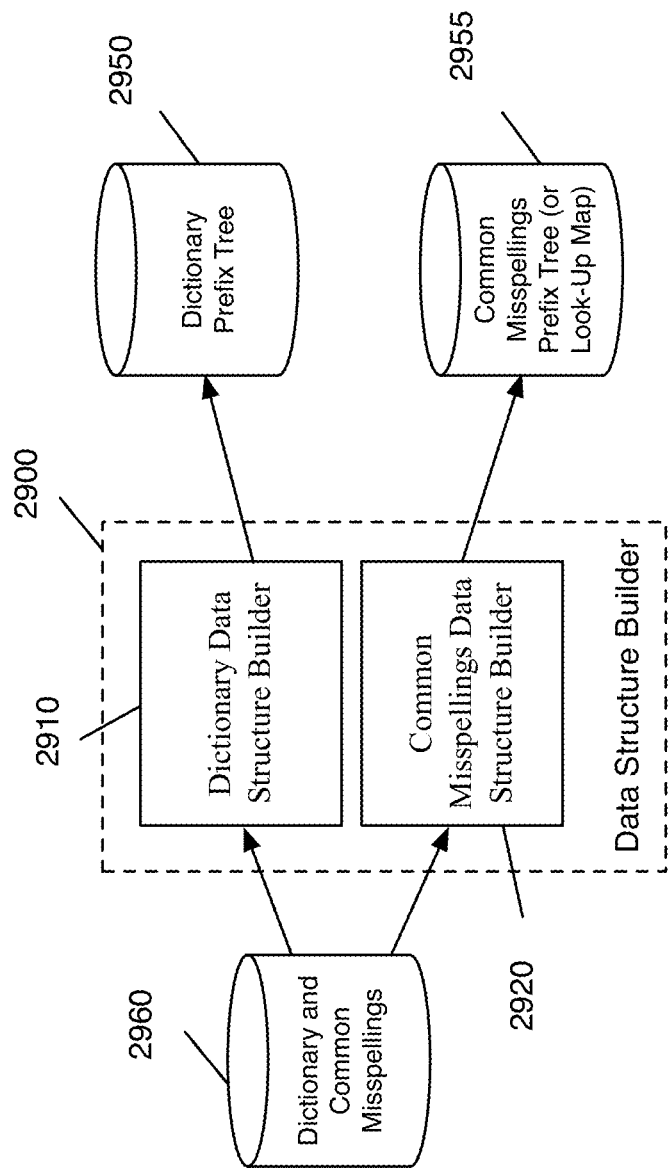
FIG. 29 conceptually illustrates the software architecture for building the prefix trees in some embodiments of the invention.

FIG. 29 conceptually illustrates the software architecture for building the dictionary and common misspellings in some embodiments of the invention. The Prefix Tree Builder component 2900 includes a Dictionary Data Structure Builder module 2910 for building the dictionary data structure (e.g., the dictionary prefix tree) 2950. In the embodiments that the data structures are built in the client device, module 2910 extracts dictionary words from the dictionary and common misspelling file 2960, which is received from the server. The Data Structure Builder component 2900 also includes a Common Misspellings Data Structure Builder module 2920 for extracting common misspellings list from the dictionary and common misspelling file 2960 and building the common misspelling prefix tree (or the look-up map). The Data Structure Builder component 2900 in some embodiments deletes the dictionary and common misspelling file 2960 after the prefix trees are built. In the embodiments that the server builds the data structures and sends them to the client, the Dictionary Data Structure Builder 2910 and Common Misspelling Data Structure Builder 2920 modules decode the data structures received from the server.

Figure 30:
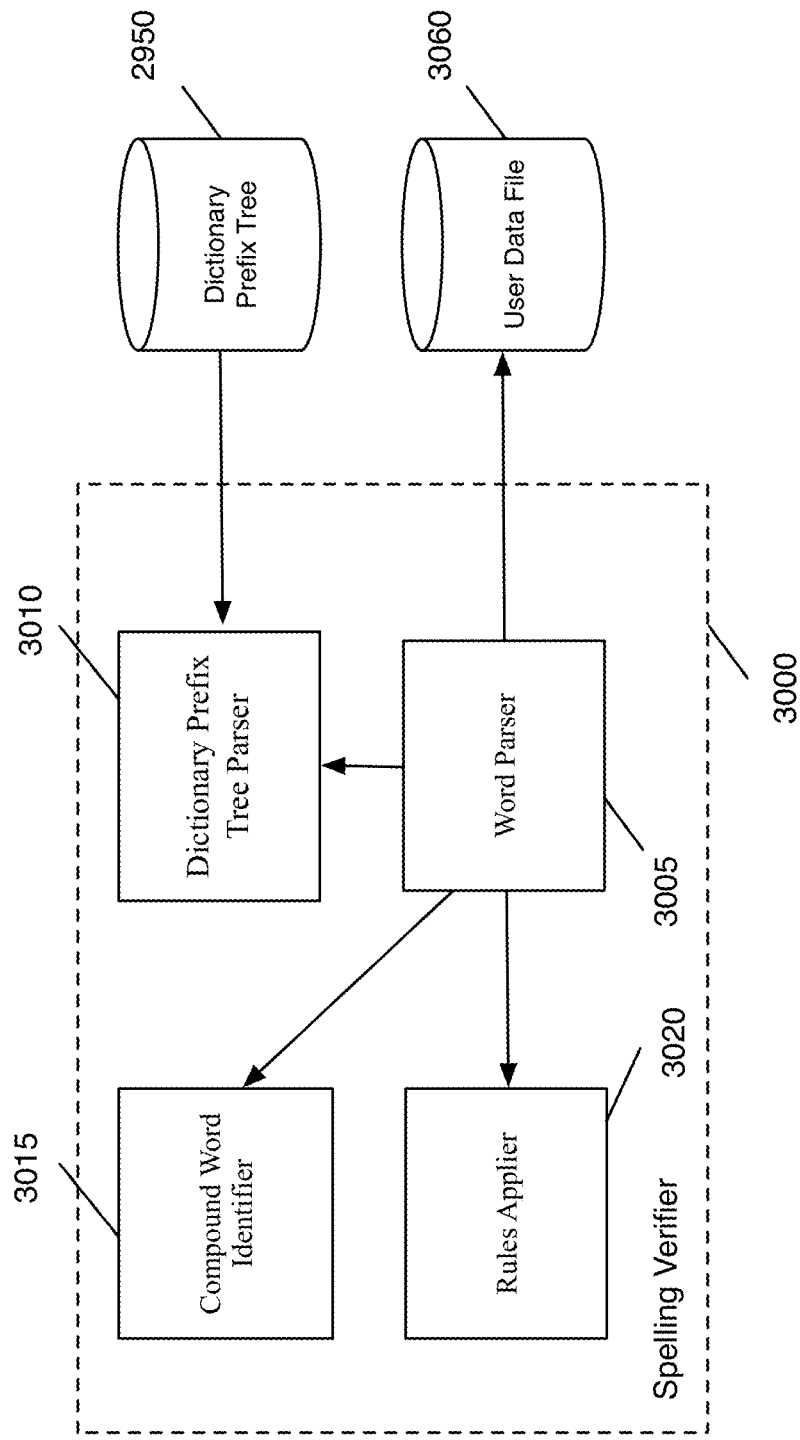
FIG. 30 conceptually illustrates the software architecture for determining whether a word is misspelled.

FIG. 30 conceptually illustrates the software architecture for determining whether a word is misspelled. The Spelling Verifier component 3000 includes a Word Parser module 3005, a Dictionary Prefix Tree Parser module 3010, a Compound Word Identified module 3015, and a Rule Applier module 3020. The Word Parser module 3005 searches for word delimiters and identifies words in a document. The Word Parser module 3005 receives the words either as a user types the words or receives the words stored in user data files 3060.

The Dictionary Prefix Tree Parser module 3010 receives the words identified by the Word Parser module 3005 and searches the dictionary prefix tree 2950 to determine whether a word is in the dictionary. The Compound Word Identifier module 3015 identifies compound words. The Rule Applier module 3020 applies a set of rules to determine whether a word is valid as typed by the user. For instance, whether the word is an IP address or a hexadecimal number.

Figure 31:
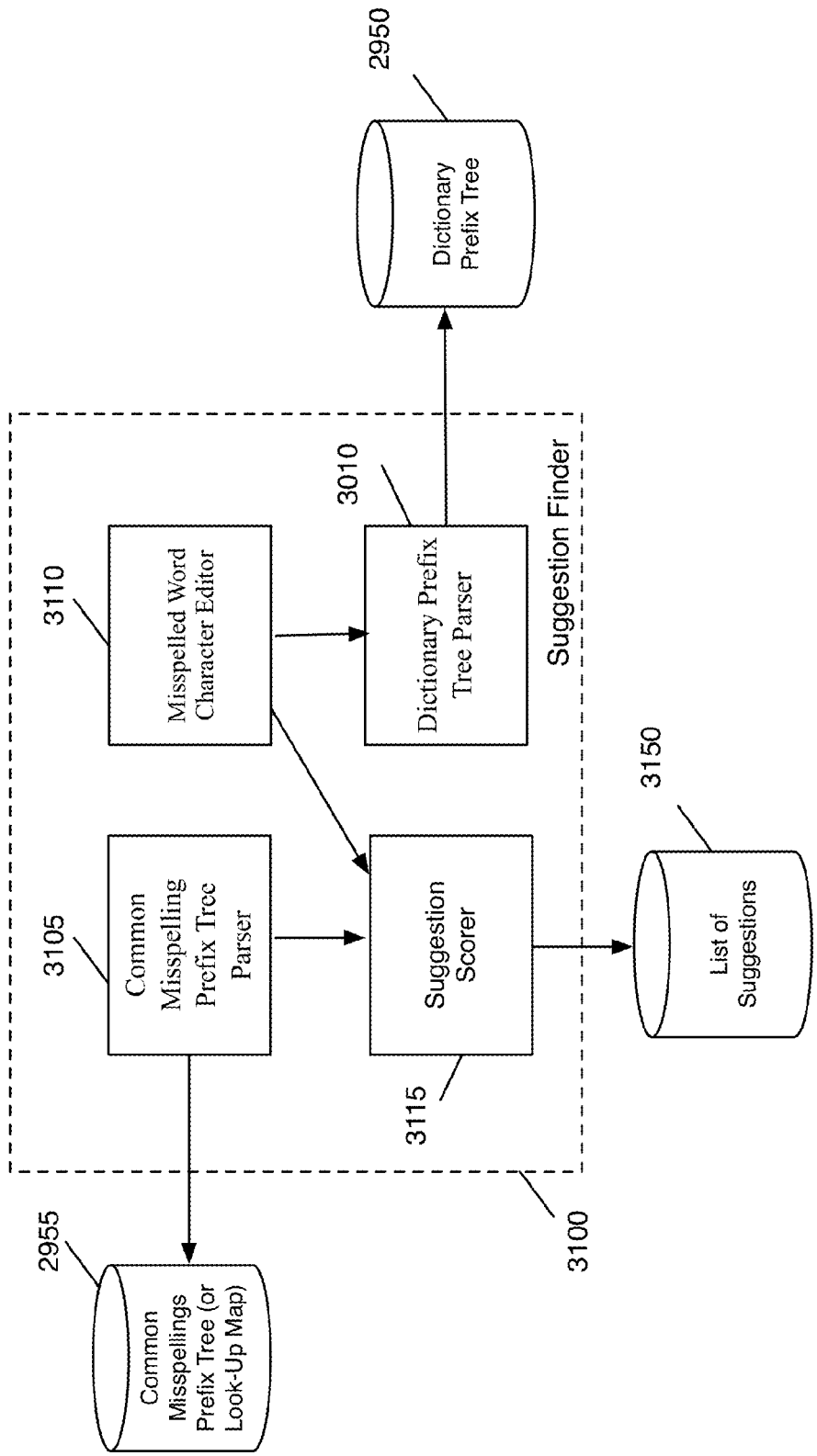
FIG. 31 conceptually illustrates the software architecture for finding suggestions for misspelled words.

FIG. 31 conceptually illustrates the software architecture for finding suggestions for misspelled words. The Suggestion Finder component 3100 includes a Common Misspelling Prefix Tree Parser module 3105, a Misspelled Word Character Editor module 3110, and a Suggestion Scorer module 3115. The suggestion Finder component also utilizes the Dictionary Prefix Tree Parser module 3010 described above.

The Common Misspelling Prefix Tree Parser module 3105 searches the common misspellings prefix tree 2955 to determine whether a misspelled word is a common misspelling and to find the suggestions associated with a commonly misspelled word. The Misspelled Word Character Editor module 3110 performs add/replace/delete on different characters of the misspelled word and uses the Dictionary Prefix Tree Parser 3010 to determine whether the edited misspelled word matches a valid word in the dictionary prefix tree 2950. Once a set of suggestions is found by the Common Misspelling Prefix Tree Parser module 3105 and the Misspelled Word Character Editor module 3110, the Suggestion Scorer module 3115 scores the suggestions and saves a predetermined number of suggestion in the list of suggestions 3150 to display to the user upon request. In the embodiments that utilize a look-up map for searching for common misspellings, the Common Misspelling Prefix Tree Parser 3105 is replaced by a Common Misspelling Look-Up module to search for common misspellings.

Figure 32:
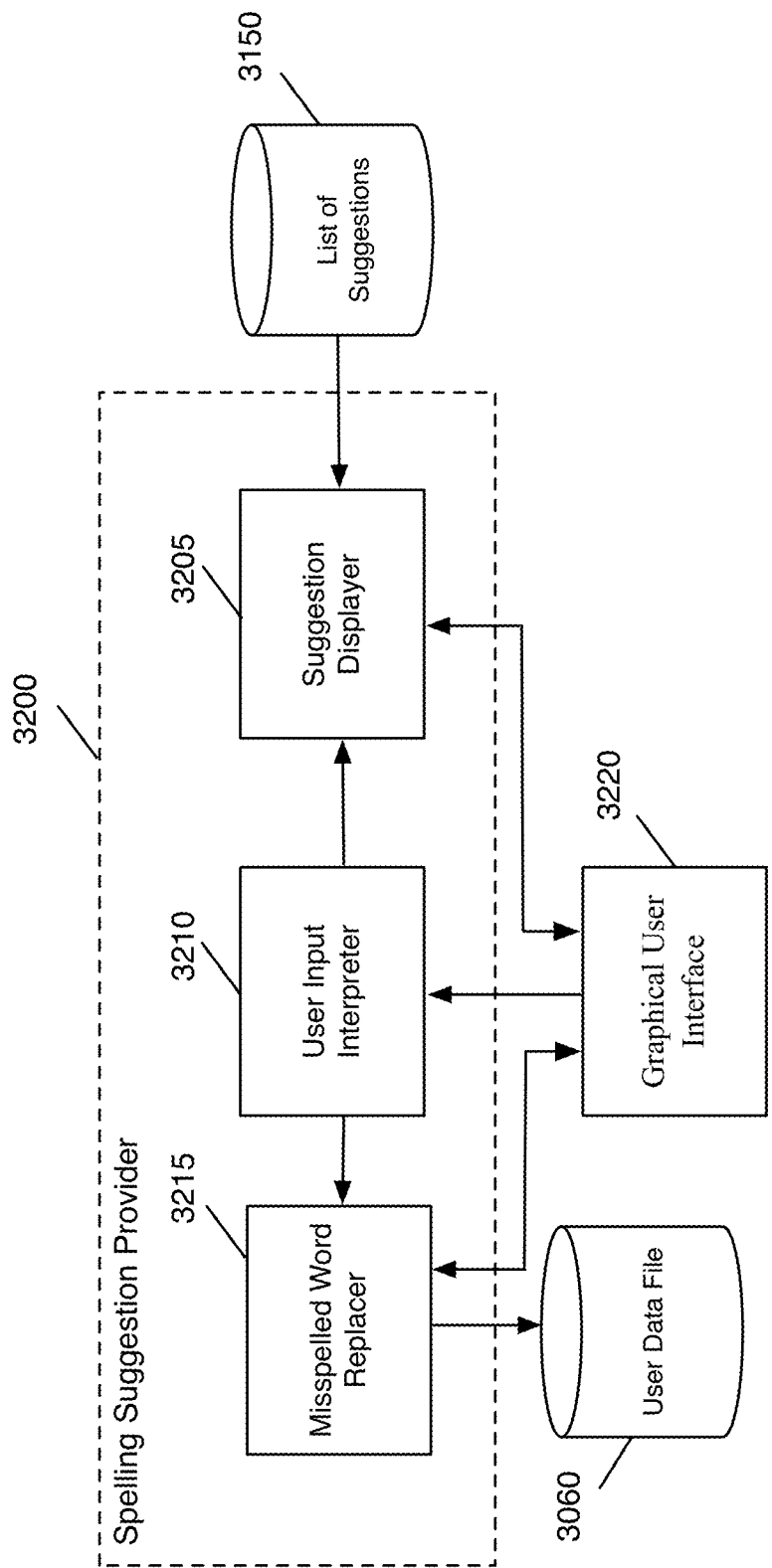
FIG. 32 conceptually illustrates the software architecture for displaying suggestions and receiving user selection for misspelled words.

FIG. 32 conceptually illustrates the software architecture for displaying suggestions and receiving user selection for misspelled words. The Spelling Suggestion Provider component 3200 includes a Suggestion Displayer module 3205, a User Input Interpreter module 3210, and a Misspelled Word Replacer module 3215.

The User Input Interpreter module 3210 receives user's input through the Graphical User Interface module 3220. When the request is for suggestions for a misspelled word, the User Input Interpreter module 3210 passes the request and the identification of the misspelled word to Suggestion Displayer module 3205.

The Suggestion Displayer module 3205 finds the suggestions for the misspelled word in the list of suggestions 3150 and displays the suggestions through the Graphical User Interface module 3220. When the request is the selection of a suggestion, the User Input Interpreter module 3210 passes the request and the identification of the suggestion and the misspelled word to the Misspelled Word Replacer module 3215. The Misspelled Word Replacer module 3215 replaces the misspelled word with the selected suggestion through the Graphical User Interface module 3220.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 33:
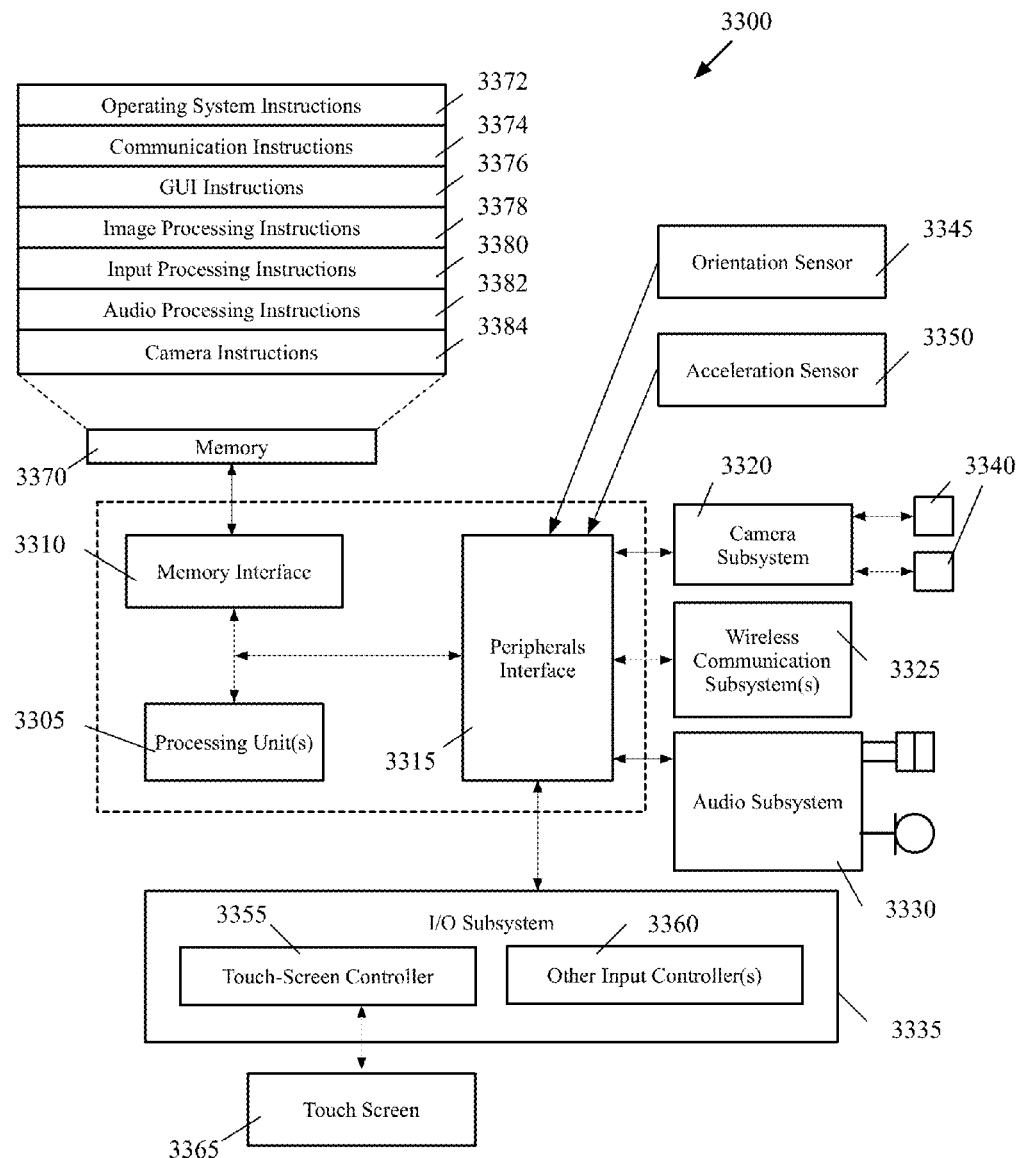
FIG. 33 is an example of an architecture of a mobile computing device in some embodiments of the invention.

Several applications such as the content authoring and publishing application, the digital content viewing application, and multimedia management application of some embodiments operate on mobile devices, such as smart phones (e.g., iPhones®), tablets and touchpads (e.g., iPads®), or ebook readers (e.g., Kindle)). FIG. 33 is an example of an architecture 3300 of such a mobile computing device. As shown, the mobile computing device 3300 includes one or more processing units 3305, a memory interface 3310 and a peripherals interface 3315.

The peripherals interface 3315 is coupled to various sensors and subsystems, including a camera subsystem 3320, a wireless communication subsystem(s) 3325, an audio subsystem 3330, an I/O subsystem 3335, etc. The peripherals interface 3315 enables communication between the processing units 3305 and various peripherals. For example, an orientation sensor 3345 (e.g., a gyroscope) and an acceleration sensor 3350 (e.g., an accelerometer) are coupled to the peripherals interface 3315 to facilitate orientation and acceleration functions.

The camera subsystem 3320 is coupled to one or more optical sensors 3340 (e.g., a charged coupled device (CCD) optical sensor, a complementary metal-oxide-semiconductor (CMOS) optical sensor, etc.). The camera subsystem 3320 coupled with the optical sensors 3340 facilitates camera functions, such as image and/or video data capturing. The wireless communication subsystem 3325 serves to facilitate communication functions. In some embodiments, the wireless communication subsystem 3325 includes radio frequency receivers and transmitters, and optical receivers and transmitters (not shown in FIG. 33). These receivers and transmitters of some embodiments are implemented to operate over one or more communication networks such as a GSM network, a Wi-Fi network, a Bluetooth network, etc. The audio subsystem 3330 is coupled to a speaker to output audio (e.g., to output user-specific questions for generating the escrow key). Additionally, the audio subsystem 3330 is coupled to a microphone to facilitate voice-enabled functions, such as voice recognition (e.g., for searching), digital recording, etc.

The I/O subsystem 3335 involves the transfer between input/output peripheral devices, such as a display, a touch screen, etc., and the data bus of the processing units 3305 through the peripherals interface 3315. The I/O subsystem 3335 includes a touch-screen controller 3355 and other input controllers 3360 to facilitate the transfer between input/output peripheral devices and the data bus of the processing units 3305. As shown, the touch-screen controller 3355 is coupled to a touch screen 3365. The touch-screen controller 3355 detects contact and movement on the touch screen 3365 using any of multiple touch sensitivity technologies. The other input controllers 3360 are coupled to other input/control devices, such as one or more buttons. Some embodiments include a near-touch sensitive screen and a corresponding controller that can detect near-touch interactions instead of or in addition to touch interactions.

The memory interface 3310 is coupled to memory 3370. In some embodiments, the memory 3370 includes volatile memory (e.g., high-speed random access memory), non-volatile memory (e.g., flash memory), a combination of volatile and non-volatile memory, and/or any other type of memory. As illustrated in FIG. 33, the memory 3370 stores an operating system (OS) 3372. The OS 3372 includes instructions for handling basic system services and for performing hardware dependent tasks.

The memory 3370 also includes communication instructions 3374 to facilitate communicating with one or more additional devices; graphical user interface instructions 3376 to facilitate graphic user interface processing; image processing instructions 3378 to facilitate image-related processing and functions; input processing instructions 3380 to facilitate input-related (e.g., touch input) processes and functions; audio processing instructions 3382 to facilitate audio-related processes and functions; and camera instructions 3384 to facilitate camera-related processes and functions. The instructions described above are merely exemplary and the memory 3370 includes additional and/or other instructions in some embodiments. For instance, the memory for a smartphone may include phone instructions to facilitate phone-related processes and functions. Additionally, the memory may include instructions for a keychain backup or restoration application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 33 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 33 may be split into two or more integrated circuits.

B. Computer System

Figure 34:
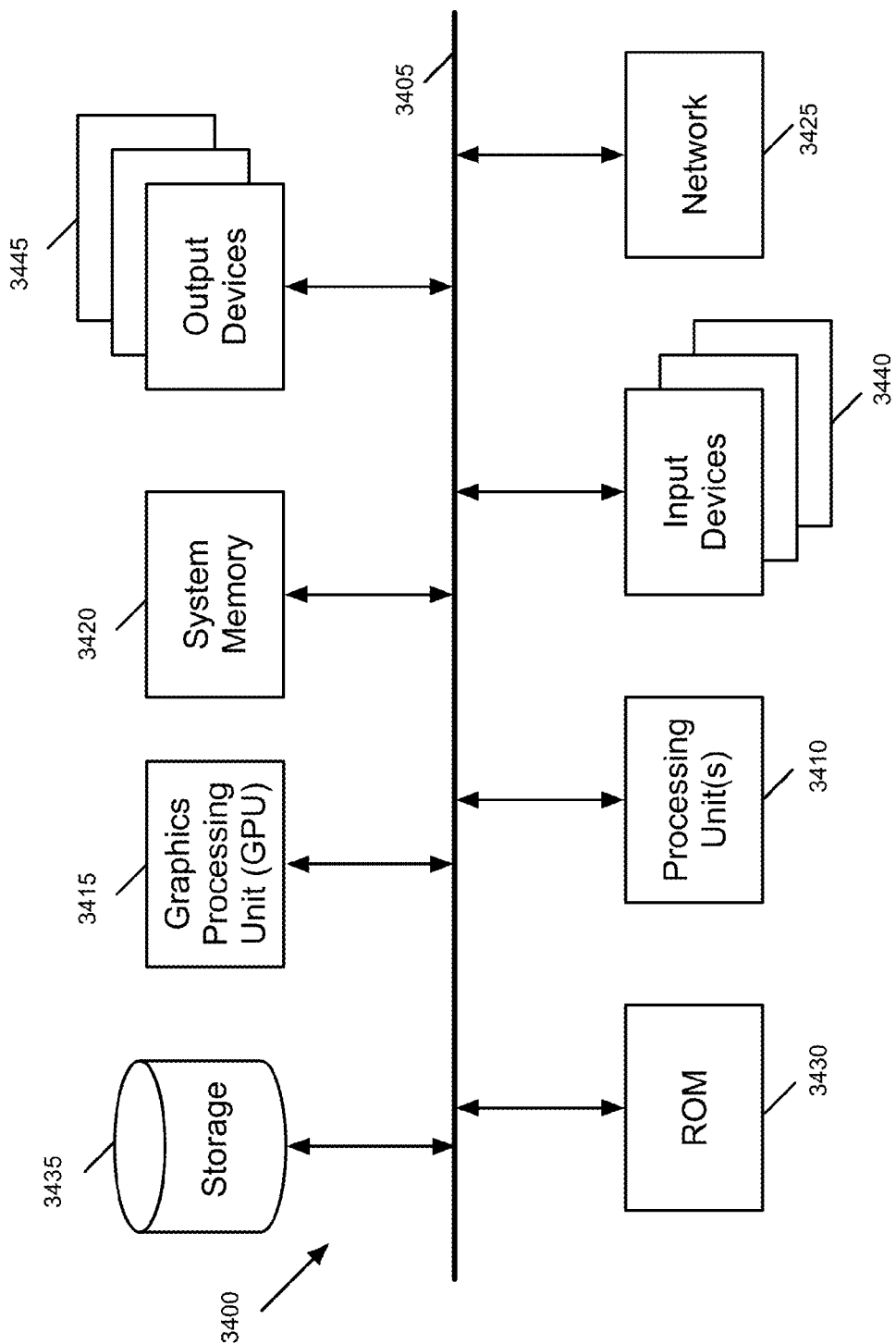
FIG. 34 conceptually illustrates an electronic system with which some embodiments of the invention are implemented.

FIG. 34 conceptually illustrates an electronic system 3400 with which some embodiments of the invention are implemented. The electronic system 3400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3400 includes a bus 3405, processing unit(s) 3410, a graphics processing unit (GPU) 3415, a system memory 3420, a network 3425, a read-only memory 3430, a permanent storage device 3435, input devices 3440, and output devices 3445.

The bus 3405 collectively represents all system, peripheral, and chipset buses that communicatively connect the numerous internal devices of the electronic system 3400. For instance, the bus 3405 communicatively connects the processing unit(s) 3410 with the read-only memory 3430, the GPU 3415, the system memory 3420, and the permanent storage device 3435.

From these various memory units, the processing unit(s) 3410 retrieves instructions to execute and data to process in order to execute the processes of the invention. The processing unit(s) may be a single processor or a multi-core processor in different embodiments. Some instructions are passed to and executed by the GPU 3415. The GPU 3415 can offload various computations or complement the image processing provided by the processing unit(s) 3410.

The read-only-memory (ROM) 3430 stores static data and instructions that are needed by the processing unit(s) 3410 and other modules of the electronic system. The permanent storage device 3435, on the other hand, is a read-and-write memory device. This device is a non-volatile memory unit that stores instructions and data even when the electronic system 3400 is off. Some embodiments of the invention use a mass-storage device (such as a magnetic or optical disk and its corresponding disk drive) as the permanent storage device 3435.

Other embodiments use a removable storage device (such as a floppy disk, flash memory device, etc., and its corresponding disk drive) as the permanent storage device. Like the permanent storage device 3435, the system memory 3420 is a read-and-write memory device. However, unlike storage device 3435, the system memory 3420 is a volatile read-and-write memory, such as random access memory. The system memory 3420 stores some of the instructions and data that the processor needs at runtime. In some embodiments, the invention's processes are stored in the system memory 3420, the permanent storage device 3435, and/or the read-only memory 3430. For example, the various memory units include instructions for processing multimedia clips in accordance with some embodiments. From these various memory units, the processing unit(s) 3410 retrieves instructions to execute and data to process in order to execute the processes of some embodiments.

The bus 3405 also connects to the input and output devices 3440 and 3445. The input devices 3440 enable the user to communicate information and select commands to the electronic system. The input devices 3440 include alpha-numeric keyboards and pointing devices (also called "cursor control devices"), cameras (e.g., webcams), microphones or similar devices for receiving voice commands, etc. The output devices 3445 display images generated by the electronic system or otherwise output data. The output devices 3445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 34, bus 3405 also couples electronic system 3400 to a network 3425 through a network adapter (not shown). In this manner, the computer can be a part of a network of computers (such as a local area network ("LAN"), a wide area network ("WAN"), or an Intranet, or a network of networks, such as the Internet. Any or all components of electronic system 3400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 13, 14, 16, 19, 21A, 21B, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of spell checking a document, the method comprising:
   at a client device, activating a browser-based application received from a server through a network;
   on the client device, receiving a data structure for a dictionary comprising a list of correctly spelled words from the server, the data structure utilized to prune the number of searches of the dictionary to match a word to strings associated with valid words in the dictionary, wherein the data structure is independent of the browser-based application and is received from the server in a data file separate from the browser-based application; and
   by the browser-based application at the client device, determining a word as having a correct spelling when the word matches a string associated with a valid word in the data structure for the dictionary.

2. The method of claim 1 further comprising:
   determining whether a second word that does not match any string associated with a valid word in the data structure for the dictionary satisfies a set of rules for valid strings; and
   identifying the second word as a misspelled word when no rule in the set of rules is satisfied.

3. The method of claim 2 further comprising:
   receiving, from the server, a data structure for a list of common misspellings comprising a set of strings representing common misspelled words, the common misspellings data structure utilized to prune the number of searches required to match a word to a string in the set of strings;
   receiving a misspelled word; and
   when the misspelled word matches a string in the common misspellings data structure, identifying a set of suggestions associated with the matched string to provide as suggestions to correct the misspelled word.

4. The method of claim 3, wherein the common misspellings data structure is a prefix tree, wherein the prefix tree comprises a plurality of nodes in a parent-child hierarchical relationship, each node associated with a character, each node further associated with a string, all descendants of a node having a common prefix of the string associated with that node, each of a plurality of nodes in the common misspellings prefix tree representing a commonly misspelled word and associated with a set of suggestions to correct the commonly misspelled word.

5. The method of claim 3, wherein the dictionary data structure and the common misspellings data structure are received from the server as encoded data structures, the method further comprising:
   at the client device, decoding the dictionary data structure from the received dictionary encoded data structure; and
   at the client device, decoding the common misspelling data structure from the received common misspelling encoded data structure.

6. The method of claim 1, wherein the browser-based application is activated by a browser on the client device, the client device comprising a plurality of browsers, the method further comprising:
   providing a set of suggestions for one or more words determined as having no correct spelling, wherein spell checking and providing suggestion for each word provides a same set of results regardless of the browser used to activate the browser-based application.

7. The method of claim 1, wherein the data structure for the dictionary is a prefix tree, the prefix tree comprising a plurality of nodes in a parent-child hierarchical relationship, each node associated with a character, each node further associated with a string, all descendants of a node having a common prefix of the string associated with that node.

8. The method of claim 1, wherein the data structure for the dictionary is a prefix tree, the method further comprising:
changing a set of characters in a misspelled word;
after changing each character, discarding the change when a resulting string is not found in the dictionary prefix tree; and
identifying a set of suggestions for the misspelled word when changing the set of characters in the misspelled word results in a valid string in the dictionary prefix tree.

9. The method of claim 8, wherein changing the set of characters comprises one of adding a character to the misspelled word, replacing a character in the misspelled word, and deleting a character in the misspelled word.

10. The method of claim 8 further comprising:
scoring the set of suggestions for the misspelled word based on a set of rules; and
displaying up to a predetermined number of high scored suggestions.

11. The method of claim 10 further comprising assigning a highest score to any suggestions found for the misspelled word in a data structure for a list of common misspellings.

12. The method of claim 8 further comprising:
scoring the set of suggestions for the misspelled word based on how many times a same suggestion is found for the misspelled word when changing the set of characters in the misspelled word results in finding the same valid string in the dictionary prefix tree; and
displaying up to a predetermined number of high scored suggestions.

13. The method of claim 8 further comprising:
scoring the set of suggestions for the misspelled word based on a number of characters that are changed in the misspelled word before changing a set of characters in the misspelled word results a valid string in the dictionary prefix tree; and
displaying up to a predetermined number of high scored suggestions.

14. A non-transitory machine-readable medium storing a browser-based application received from a server through a network for spell checking a document on a client device, the browser-based application executable by at least one processing unit, the browser-based application comprising sets of instructions for:
receiving, on the client device, a data structure for a dictionary comprising a list of correctly spelled words from the server, the data structure utilized to prune the number of searches of the dictionary to match a word to strings associated with valid words in the dictionary, wherein the data structure is independent of the browser-based application and is received from the server in a data file separate from the browser-based application; and
determining a word as having a correct spelling when the word matches a string associated with a valid word in the data structure for the dictionary.

15. The non-transitory machine-readable medium of claim 14, the browser-based application further comprising sets of instructions for:
determining whether a second word that does not match any string associated with a valid word in the data structure for the dictionary satisfies a set of rules for valid strings; and
identifying the second word as a misspelled word when no rule in the set of rules is satisfied.

16. The non-transitory machine-readable medium of claim 15, the browser-based application further comprising sets of instructions for:
receiving, from the server, a data structure for a list of common misspellings comprising a set of strings representing common misspelled words, the data structure for the common misspellings utilized to prune the number of searches required to match a word to a string in the set of strings;
receiving a misspelled word; and
identifying, when the misspelled word matches a string in the common misspellings data structure, a set of suggestions associated with the matched string to provide as suggestions to correct the misspelled word.

17. The non-transitory machine-readable medium of claim 16, wherein the common misspellings data structure is a prefix tree, wherein the prefix tree comprises a plurality of nodes in a parent-child hierarchical relationship, each node associated with a character, each node further associated with a string, all descendants of a node having a common prefix of the string associated with that node, each of a plurality of nodes in the common misspellings prefix tree representing a commonly misspelled word and associated with a set of suggestions to correct the commonly misspelled word.

18. The non-transitory machine-readable medium of claim 16, wherein the dictionary data structure and the common misspellings data structure are received from the server as encoded data structures, the browser-based application further comprising sets of instructions for:
decoding the dictionary data structure from the received dictionary encoded data structure; and
decoding the common misspelling data structure from the received common misspelling encoded data structure.

19. The non-transitory machine-readable medium of claim 14, wherein the browser-based application is activated by a browser on the client device, the client device having a plurality of browsers, the browser-based application further comprising a set of instructions for providing a set of suggestions for one or more words determined as having no correct spelling, wherein spell checking and providing suggestion for each word provides a same set of results regardless of the browser used to activate the browser-based application.

20. The non-transitory machine-readable medium of claim 14, wherein the data structure for the dictionary is a prefix tree, the prefix tree comprising a plurality of nodes in a parent-child hierarchical relationship, each node associated with a character, each node further associated with a string, all descendants of a node having a common prefix of the string associated with that node.

21. The non-transitory machine-readable medium of claim 14, wherein the data structure for the dictionary is a prefix tree, the browser-based application further comprising sets of instructions for:
changing a set of characters in a misspelled word;
discarding, after changing each character, the change when a resulting string is not found in the dictionary prefix tree; and identifying a set of suggestions for the misspelled word when changing the set of characters in the misspelled word results a in valid string in the dictionary prefix tree.

22. The non-transitory machine-readable medium of claim 21, wherein the set of instructions for changing the set of characters comprises sets of instructions for (i) adding a character to the misspelled word, (ii) replacing a character in the misspelled word, or (iii) deleting a character in the misspelled word.

23. The non-transitory machine-readable medium of claim 21, the browser-based application further comprising sets of instructions for:
   scoring the set of suggestions for the misspelled word based on a set of rules; and
   displaying up to a predetermined number of high scored suggestions.

24. The non-transitory machine-readable medium of claim 23, the browser-based application further comprising a set of instructions for assigning a highest score to any suggestions found for the misspelled word in a data structure for a list of common misspellings.

25. The non-transitory machine-readable medium of claim 23, the browser-based application further comprising sets of instructions for:
   scoring the set of suggestions for the misspelled word based on how many times a same suggestion is found for the misspelled word when changing the set of characters in the misspelled word results in finding the same valid string in the dictionary prefix tree; and
   displaying up to a predetermined number of high scored suggestions.

26. The non-transitory machine-readable medium of claim 21, the browser-based application further comprising sets of instructions for:
   scoring the set of suggestions for the misspelled word based on a number of characters that are changed in the misspelled word before changing a set of characters in the misspelled word results a valid string in the dictionary prefix tree; and
   displaying up to a predetermined number of high scored suggestions.

* * * * *